(12) United States Patent
Matsumura et al.

(10) Patent No.: US 6,968,283 B2
(45) Date of Patent: Nov. 22, 2005

(54) GAS FLOW METER

(75) Inventors: Takafumi Matsumura, Hitachinaka (JP); Noboru Sugiura, Mito (JP); Kenichi Katagishi, Hitachinaka (JP); Masahiro Matsumoto, Hitachi (JP); Keiji Hanzawa, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/848,166

(22) Filed: May 19, 2004

(65) Prior Publication Data
US 2004/0210410 A1 Oct. 21, 2004

Related U.S. Application Data

(63) Continuation of application No. 09/942,030, filed on Aug. 30, 2001, now Pat. No. 6,810,345.

(30) Foreign Application Priority Data

Apr. 11, 2001 (JP) ........................................ 2001-113324

(51) Int. Cl.[7] ................................................ G01F 1/12
(52) U.S. Cl. ........................... 702/100; 702/50; 702/12; 702/45
(58) Field of Search ........................ 702/100, 50, 12, 702/45

(56) References Cited

U.S. PATENT DOCUMENTS

| | | | | |
|---|---|---|---|---|
| 4,437,345 A | * | 3/1984 | Egami et al. | 73/204.16 |
| 4,885,943 A | * | 12/1989 | Tootell et al. | 73/861.77 |
| 4,896,282 A | * | 1/1990 | Orwell | 702/107 |
| 5,263,369 A | * | 11/1993 | Cutler | 73/204.15 |
| 5,347,843 A | * | 9/1994 | Orr et al. | 73/1.34 |
| 5,911,238 A | * | 6/1999 | Bump et al. | 137/487.5 |
| 5,975,126 A | * | 11/1999 | Bump et al. | 137/487.5 |
| 5,994,892 A | * | 11/1999 | Turino et al. | 324/142 |
| 6,343,617 B1 | * | 2/2002 | Tinsley et al. | 137/486 |
| 6,782,744 B1 | * | 8/2004 | Tashiro et al. | 73/204.22 |

FOREIGN PATENT DOCUMENTS

| | | |
|---|---|---|
| DE | 19730580 | 1/1999 |
| JP | 2085724 | 3/1990 |
| JP | 5203475 | 8/1993 |
| JP | 5223611 | 8/1993 |
| JP | 8062010 | 3/1996 |
| JP | 8247815 | 9/1996 |
| JP | 9307361 | 11/1997 |
| JP | 11118552 | 4/1999 |
| JP | 2000338193 | 12/2000 |

OTHER PUBLICATIONS

A. E. Perry, "A Study of the Constant–Temperature Hot–Wire Anemometer", J. Fluid Mech., pp. 577–599, 1971.
"Road Vehicles—Electrical Disturbance by Conduction and Coupling", International Standard, Jun. 1, 1990.
Japan Automotive Standard D001–94.
"CMOS Analog Circuit Design Technique", Triceps, 1994.

* cited by examiner

*Primary Examiner*—Michael Nghiem
*Assistant Examiner*—Stephen J. Cherry
(74) *Attorney, Agent, or Firm*—Crowell & Moring LLP

(57) ABSTRACT

A gas flow meter having a gas flow detection circuit for detecting a current flowing through a resistor installed in a gas passage and a voltage generated across the resistor and outputting a voltage signal representing a gas flow passing through the gas passage; a noise reduction circuit for reducing external noise; and a digital adjusting circuit for digitally adjusting a signal representing the detected gas flow and outputting the adjusted signal; wherein a voltage signal based on the signal adjusted by the digital adjusting circuit is output.

9 Claims, 20 Drawing Sheets

ADJUSTMENT CALCULATION FORMULA FOR
TEMPERATURE CHARACTERISTIC (CONSTANT FLOW)

OUTPUT CHARACTERISTIC ERROR AFTER
TEMPERATURE CHARACTERISTIC ADJUSTMENT
(CONSTANT FLOW)

FIG. 29

GAS FLOW METER

This is a continuation of application Ser. No. 09/942,030, filed Aug. 30, 2001, now U.S. Pat. No. 6,810,345.

BACKGROUND OF THE INVENTION

The present invention relates to a gas flow meter for automotive control and more particularly to a noise reduction circuit, to an adjustment circuit, to a reduction in the number of adjustment terminals and output terminals, and to an output circuit.

A gas flow meter for detecting an air flow in internal combustion engines has been in use. An example of the gas flow meter is a constant temperature control hot wire type gas flow meter described in the Journal of Fluid Mechanics, vol. 47 (1971), pp577–599. FIG. 25 shows an outline configuration of a gas flow detection circuit DECT1 applying the constant temperature control heat wire type gas flow meter. This gas flow detection circuit mainly comprises an operational amplifier OP1, a power transistor Tr1, a heating resistor (also called a hot wire) Rh, a gas temperature measuring resistor (also called a cold wire) Rc and resistors R1, R2 and keeps the temperature of the heating resistor Rh constant at all times, i.e., keeps its resistance constant by maintaining a bridge balance using the operational amplifier OP1. As the gas flow increases, heat taken from the heating resistor Rh increases resulting in an increased heating current. Because this heating current is proportional to a voltage between terminals of the resistor R1, the measurement of this voltage can determine the gas flow. The voltage output produced by the current detection resistor R1 is processed by an adjust circuit having a predetermined input/output characteristic so that the voltage output provides a predetermined signal characteristic required of the gas flow meter.

There is another gas flow detection circuit DECT2, as shown in FIG. 26, in which heat sensing resistors Ru, Rd for measuring gas flow temperatures are arranged upstream and downstream of the heating resistor Rh of the constant temperature control hot wire type gas flow meter so that they are influenced by heat from the heating resistor Rh. The resistor Ru on the upstream side is cooled by the gas flow to lower its resistance and the resistor Rd on the downstream side receives a gas flow heated by the heating resistor Rh to raise its temperature and therefore its resistance. This changes the potential at a connecting point between Ru and Rd and thus measuring this voltage can determine the gas flow.

Still another gas flow detection circuit DECT3 as shown in FIG. 27 is available, in which a total of four heat sensing resistors for measuring gas flow temperatures are arranged two upstream and two downstream of the heating resistor Rh of the constant temperature control hot wire type gas flow meter so that they are influenced by heat from the heating resistor Rh, and in which one pair of resistors Ru1, Rd1 are serially connected in an upstream-downstream order and another pair of resistors Rd2, Ru2 are serially connected in a downstream-upstream order to form a bridge and measure a potential difference between two connecting points. The resistors Ru1, Ru2 on the upstream side are cooled by the gas flow to lower their resistances and the resistors Rd1, Rd2 on the downstream side receive a gas flow heated by the heating resistor Rh, raising their temperatures and therefore their resistances. This changes the potential difference in the bridge and thus measuring this voltage difference can determine the gas flow.

The electronic circuits that adjust the output characteristic of a gas flow meter mounted on motor vehicles are subject to various surges and overvoltages, as specified in the International Standard Organization (ISO) 7637-1, 7637-3 standard and Japan automotive standard (JASO) D001-94. These standards are intended to prevent undesired operations or failures of electronic circuits due to surge voltages caused by ignition of engine, overvoltages caused by batteries stacked in two tiers at time of starting engine in cold environment, and high frequency noise caused by other electronic devices. On the other hand, the electronic circuits are constructed in the form of IC circuits for reducing the manufacturing cost and, in recent years, to meet the emission control requirements the gas flow meter is increasingly required to raise its precision in line with the sophistication of engine control functions. Further, because the service temperature range is as wide as −40° C. to 130° C., measures should be taken to prevent a possible change in output due to temperature variations.

For surges and overvoltages, a variety of overvoltage Protection circuits have been in use. One such example is a protection circuit using a Zener diode ZD and a current limiting resistor R as shown in FIG. 28.

The circuit of FIG. 28 is one type of a commonly used constant voltage circuit in which a voltage applied to a connection terminal VBB for the battery causes a current to flow through the current limiting resistor R to the Zener diode ZE. When an overvoltage is applied, the voltage of the power supply terminal Vcc to various circuits is clamped by a Zener voltage of the Zener diode ZD to put an overvoltage protection into action.

Further, JP-A-9-307361 proposes as a conventional technology an overvoltage protection circuit that uses an overvoltage detection circuit made up of a resistor and a Zener diode and a switching circuit made up of bipolar transistors.

The overvoltage protection circuit described in this official gazette is intended for protecting microwave FETs (field-effect transistors). When an overvoltage higher than a voltage sum of the Zener voltage of the Zener diode and the base-emitter voltage of the switching transistor is applied to the power supply terminal, the switching circuit is operated to cut off the load from the power supply line and thereby prevent the overvoltage from being impressed on the load.

The voltage outputs of the flow detection circuits DECT1–3 in FIG. 25 to FIG. 27 need adjustments in zero point and span (output range) to produce the required sensor output characteristics. This adjust circuit is mainly an analog circuit at present but a higher precision adjustment is considered possible by using a digital circuit.

Table 1 shows comparison between an analog circuit and a digital circuit ("CMOS Analog Circuit Design Technique" published by Triceps (1998), compiled under the supervision of Iwata).

TABLE 1

|  | Analog circuit | Digital circuit |
| --- | --- | --- |
| No. of transistors | Few (about 20 pcs in multiplier) | Many (2000 pcs in 8-bit multiplier) |
| Chip area | Small (few devices) | Large (many devices) |
| Power consumption | Low power consumption because of fewer devices | Large (many gates are switched) |
| Clock frequency | Low (determined by settling of amplifier) | Higher (½ of cut-off frequency of device) |
| Signal | High (about ½ of | Low (1/10 of clock |

TABLE 1-continued

|  | Analog circuit | Digital circuit |
| --- | --- | --- |
| frequency | cut-off frequency of device) | frequency) |
| Precision | Low (device deviation, noise) | High (depending on bit number) |
| Stability | Low (oscillation, characteristic variation) | High |
| Noise resistance | Low (S/N) | Strong (large noise margin) |

Source:
"CMOS Analog Circuit Design Technique" published by Triceps (1998), compiled under the supervision of Iwata The analog circuit has a small size and a small power consumption compared with the digital circuit. But the use of such devices as resistors causes manufacturing variations and other variations due to aged deterioration, and thus the analog circuit has less precision and stability than the digital circuit. The digital circuit, while it is superior to the analog circuit in terms of precision and stability, has a larger circuit size and a larger power consumption. The rapid advance in the integrated circuit manufacturing technology in recent years, however, has enabled micro-fabrication and therefore reduced the circuit size and power consumption. The digital circuit is now finding many applications in various industrial fields. Example applications of a digital adjust circuit to the gas flow meter are found in Japanese Patent No. 3073089 and JP-A-8-62010 and JP-A-11-118552.

FIG. 29 shows comparison between an analog adjustment and a digital adjustment in the adjust circuit of the gas flow meter.

An outline circuit configuration for analog adjustment shown in FIG. 29 comprises an operational amplifier OP2, trimming resistors Rs1, Rz1 and resistors Rs2, Rz2. This circuit trims the trimming resistors Rz1, Rs1 to adjust the voltage output from the flow detection circuit DECT and thereby adjust the zero point and span to produce an output for a desired gas flow. As the trimming resistors Rs, Rz, thin-film resistors printed on a hybrid IC or thin-film resistors on IC may be used. In trimming the resistors, a laser trimmer may be used. The laser trimmer has a disadvantage that trimming with high precision takes time and re-trimming cannot be done. Further, because only a two-point adjustment is made, it is difficult for the laser trimmer to make a complicated adjustment on the output characteristic, such as a non-linear adjustment. In the analog circuit, when the output specification for the gas flow is changed, the resistance value needs to be redesigned and, in some cases, it is necessary to redesign the hybrid IC substrate pattern, which in turn increases the man-hour of designing works.

In the case of the digital adjust circuit of FIG. 29, since the output specification can be changed by simply changing an adjust coefficient while leaving the circuit pattern intact, the number of design steps can be reduced. As an example digital adjust circuit, a method described in Japanese Patent No. 3073089 has been proposed. A rough circuit configuration for the digital adjustment is as follows. The voltage output from the flow detection circuit DECT is converted into a digital value by an analog-digital converter AD. Based on the digital value, a digital processor CALC calculates the zero point and span adjustments, which are then converted by a digital-analog converter DA into an analog signal which is an analog output for a desired gas flow. The adjust coefficient used in this calculation is stored in a storage device MEM such as PROM. Further, the digital processor CALC, because of its ability to easily perform non-linear calculations, can make non-linear adjustments as well as zero point and span adjustments during the output adjustment. With this non-linear adjustment, the adjustment accuracy is within ±2%.

Another example configuration for the digital adjustment is found in JP-A-11-118552. While its configuration is similar to that of the digital adjust circuit of FIG. 29, this circuit reduces its circuit size by using an oversampling type analog-digital converter including a delta-sigma modulator as an analog-digital converter AD.

Still another example configuration for the digital adjustment is found in JP-A-2000-338193. The adjust coefficient used by the processor in executing the adjustment calculation is written into a storage device such as PROM through a terminal of a digital input/output circuit that communicates with external circuits of the sensor. This official gazette describes that a third-degree polynomial is used for the adjustment calculation.

A further example configuration for the digital adjustment is found in JP-A-11-94620. This circuit converts a flow signal from the gas flow detection circuit into a rectangular wave signal and counts up a counter at a certain rate only while the rectangular wave is "1". To this count value is added the adjust coefficient to produce an output.

Because the heating current flowing through the heating resistor Rh is not affected by voltage variations in the power supply (for example, battery), the voltage output of the gas flow detection circuit DECT1 has a non-ratiometric characteristic. As output specifications of the gas flow meter, there are ratiometric analog and digital output specifications in addition to the non-ratiometric analog output specification. A circuit configuration that realizes the ratiometric analog output circuit is described in JP-A-2-85724. This circuit divides an external ratiometric output reference voltage into smaller voltages by two resistors and inputs the divided voltages to an operational amplifier to realize a ratiometric output. With a sum of the two resistors set to about 10 kilo-ohm, the current to be supplied from the reference voltage is relatively small at about 0.5 mA. An example of the digital output circuit is disclosed in JP-A-8-247815. This circuit configuration comprises at least a constant temperature control circuit, a zero point/span adjust circuit and a voltage control oscillator, all integrated into one chip.

Another configuration is described in JP-A-5-203475 in which an analog output and a digital output are produced by a single circuit board. In this configuration, a single circuit board is provided with both an analog output terminal and a digital output terminal, and both analog and digital outputs are supplied to an output connector which selects and uses one of the two output signals or only one of the outputs is connected through wire to the output connector.

SUMMARY OF THE INVENTION

When the gas flow meter circuit is integrated into a digital circuit to reduce the cost and size of the gas flow meter and enhance the accuracy of the output by adjustment, the conventional technique described above is not optimized and thus has some problems that cannot be solved by conventional technology.

C-MOSs are used for enhancing the level of circuit integration and for building the gas flow meter circuit with a digital circuit. The C-MOSs, however, are easily affected by surges and overvoltages compared with bipolar transistors used in analog circuits and thus need countermeasures.

In an overvoltage protection circuit shown in FIG. 28, when a current through a connected circuit is large, a resistance of a current limiting resistor must be reduced to prevent a voltage drop. In this case the electric withstandability of a Zener diode ZD is increased large enough so that it can withstand an overcurrent. This results in an increase in size and cost of components, which is not desirable.

A circuit described in JP-A-2000-338193 performs a nonlinear adjustment using a cubic equation. When the nonlinear adjustment needs to be done with a quatic equation or higher order function, the calculation time naturally increases. In addition, if individual output characteristics have steep characteristic changes with respect to an ideal characteristic, the output characteristics may often not be able to be adjusted with such a polynomial.

Next, in integrating the electronic circuit of the gas flow meter into a digital circuit, because adjustment coefficients need to be written into a programmable storage device during the adjustment process, terminals must be added. Further, there are different specifications on the sensor output, i.e., a ratiometric analog output, a non-ratiometric analog output and a digital output. For reduced manufacturing cost, it is necessary during the integration process to make provisions for coping with all these specifications. Simply adding terminals to meet this requirement, as described in Japanese JP-A-11-94620, results in an increase in the chip area, which should be avoided.

Next, when the adjustment calculation is digitized, a digital-analog converter may be required at the output stage. The digital-analog converter includes an amplifier circuit for a signal output to external circuits and thus its current consumption reaches several mA. When the digital-analog converter is to be driven by using an external reference voltage to produce a ratiometric output, if the maximum current supplied from its power supply is small, the digital-analog converter cannot be operated. This raises a problem that the reference voltage cannot be connected directly to the power supply terminal of the digital-analog converter.

It is therefore an object of the present invention to provide a means which solves various problems encountered when reducing the cost and size of the gas flow meter, enhancing the integration level of electronic circuits, making the output characteristics more accurate and adjustable, and transforming the circuits into digital circuits.

To achieve the above objective, the present invention discloses the following configuration:

(1) A gas flow meter comprising:

a gas flow detection circuit for detecting a current flowing through a resistor installed in a gas passage and a voltage generated across the resistor and outputting a voltage signal representing a gas flow passing through the gas passage;

a noise reduction circuit for reducing external noise; and a digital adjust circuit for digitally adjusting a signal representing the detected gas flow and outputting the adjusted signal;

wherein a voltage signal based on the signal adjusted by the digital adjust circuit is output.

(2) Preferably, the gas flow meter according to item (1), wherein the digital adjust circuit includes:

a digital conversion circuit for converting an output from the gas flow detection circuit into a digital signal;

an adjust means for adjusting the digital signal to produce a desired output characteristic; and a regulator circuit for supplying a reference voltage to the digital conversion circuit and/or the adjust means.

With the above arrangement, the digital adjustment type gas flow meter has a more appropriate circuit configuration.

(3) Preferably, a gas flow meter comprising:

a gas flow detection circuit for detecting a gas flow passing through a gas passage;

an adjust circuit for adjusting an output characteristic to a desired output characteristic and outputting it; and a noise reduction circuit including an overvoltage protection circuit and supplying to the gas flow detection circuit and the adjust circuit a voltage whose surges and overvoltages applied to a power supply terminal are reduced;

wherein there are two or more voltage supply paths for supplying different voltages to the gas flow detection circuit and the adjust circuit through the overvoltage protection circuit.

With this arrangement, the minimum required voltage can be properly supplied to the gas flow detection circuit and the adjust circuit of the gas flow meter.

(4) Preferably, the gas flow meter according to item (3), wherein in one of the voltage supply paths for supplying a voltage having reduced surges and overvoltages to various circuits, a voltage limiter circuit that turns on when applied with a voltage in excess of a predetermined voltage is connected between a voltage supply terminals and a ground terminal and a current limiting resistor is connected between the power supply terminal and the voltage supply terminals; in the other voltage supply path, another current limiting resistor is connected between the power supply terminal and the voltage supply terminals; and an overvoltage protection circuit is provided in which a diode is connected between each of the voltage supply terminals.

With this arrangement, the overvoltage protection circuit has a more appropriate configuration.

(5) Preferably, the gas flow meter according to item (3), wherein in all of the voltage supply paths for supplying a voltage having reduced surges and overvoltages to various circuits, a voltage limiter circuit that turns on when applied with a voltage in excess of a predetermined voltage is connected between voltage supply terminals and a ground terminal and a current limiting resistor is connected between the power supply terminal and the voltage supply terminals; and an overvoltage protection circuit is provided in which the current limiting resistors connected to the respective voltage supply terminals have different resistances.

With this arrangement, the noise reduction circuit has a more appropriate configuration.

(6) Preferably, the gas flow meter according to item (4) or (5), further including an overvoltage protection circuit having an additional diode connected between the voltage supply terminals and the ground terminal.

With this arrangement, the overvoltage protection circuit has a more appropriate configuration.

(7) Preferably, the gas flow meter according to any one of items (3) through (6), wherein a part or all of devices included in the overvoltage protection circuit, the gas flow detection circuit and the adjust circuit are formed in the same integrated circuit.

With this arrangement, the circuit can be reduced in size.

(8) Preferably, the gas flow meter according to any one of items (3) through (7), wherein the number of the voltage supply paths are two; and a circuit connected to a higher supply voltage is an operational amplifier in the gas flow detection circuit and a circuit connected to a lower supply voltage is a regulator that supplies a voltage to the digital adjust circuit.

With this arrangement, the digital adjustment type gas flow meter has a more appropriate configuration.

(9) Preferably, a gas flow meter preferably comprising:

a gas flow detection circuit for outputting a voltage signal representing a gas flow passing through a gas passage; and an adjust circuit for adjusting the voltage output from the gas flow detection circuit;

wherein an input range of the voltage signal entered into the adjust circuit is divided in two or more and, in each divided range, a different adjustment calculation formula is determined in advance;

wherein a means is provided which selects the adjustment calculation formula according to an input-value of the voltage signal entered into the adjust circuit and performs adjustment calculation to produce an output value.

With this arrangement, the gas flow meter can perform a more precise adjustment during the output characteristic adjustment.

(10) Preferably, the gas flow meter according to item (9), wherein the adjust circuit is a digital adjust circuit which digitally adjusts the signal representing the detected gas flow and outputs the adjusted signal.

With this arrangement, the adjustment as described in item (9) can be realized.

(11) Preferably, the gas flow meter according to item (9) or (10), wherein the adjust circuit has input/output characteristics represented by each of the adjustment calculation formulas expressed as a first-degree function of y=a·x+b where x is an output value of the gas flow detection circuit, i.e., input value for the adjustment calculation, y is an output of the adjustment calculation, and a and b are adjustment coefficients.

With this arrangement, the calculation time can be shortened.

(12) Preferably, the gas flow meter according to any one of items (9) through (11), further including:

a temperature sensor; and a digital conversion circuit for converting an output of the temperature sensor into a digital value;

wherein the adjust circuit also uses the output of the temperature sensor in performing the adjustment calculation.

With this arrangement, the temperature adjustment can be made.

(13) Preferably, the gas flow meter according to item (12), wherein the adjust circuit has an input/output characteristic expressed by $$y=(a1·t+a2)·x+(b1·t+b2)$$

where x is an output value of the gas flow detection circuit, t is an output value of the temperature sensor, and a1, a2, b1 and b2 are adjustment coefficients.

With this arrangement, the digital adjust circuit can perform an appropriate adjustment.

(14) Preferably, the gas flow meter according to item (11) or (13), wherein the adjust circuit writes the adjustment coefficients a, a1, a2, b, b1 and b2 into a programmable storage device.

With this arrangement, the digital adjust circuit has an appropriate circuit configuration.

(15) Preferably, the gas flow meter according to item (11) or (13), wherein the adjust circuit writes the adjustment coefficients a, a1, a2, b, b1 and b2 into an erasable and programmable storage device.

With this arrangement, the digital adjust circuit has an appropriate circuit configuration.

(16) Preferably, a gas flow meter comprising:

a gas flow detection circuit for outputting a voltage signal representing a gas flow passing through a gas passage;

an adjust circuit for adjusting the voltage output of the gas flow detection circuit;

a storage device for storing data for adjustment; and a data input/output circuit;

wherein the data input/output circuit has two external data communication terminals for writing adjust data from outside into the storage device and for reading data from the storage device to the outside.

With this arrangement, the gas flow meter can be made small in size.

(17) Preferably, the gas flow meter according to item (16), wherein the adjust circuit has a means which, after a predetermined number, two or more, of pulses have been supplied to one of the external data communication terminals of the data input/output circuit, allows the adjust circuit to enter into a data communication mode where it transfers data between the storage device and external circuits. With this arrangement, the adjust circuit can be prevented from undesirably entering into the data communication mode even when pulse noise is impressed during normal operation.

(18) Preferably, a gas flow meter comprising:

a gas flow detection circuit for outputting a voltage signal representing a gas flow passing through a gas passage;

an adjust circuit for adjusting the voltage output of the gas flow detection circuit; and a storage device for storing data for adjustment;

wherein the adjust circuit retrieves as the output signal of the detected gas flow a ratiometric analog output, a non-ratiometric analog output and a digital output and selects one of these output signals by an output selection means provided in the adjust circuit.

With this arrangement, a single gas flow meter can cope with a variety of output specifications and contribute to standardization and reduction in manufacturing cost.

(19) Preferably, the gas flow meter according to item (18), wherein circuits for producing the ratiometric analog output, the non-ratiometric analog output and the digital output are formed on the same integrated circuit.

With this arrangement, the circuit can be reduced in size.

(20) Preferably, the gas flow meter according to item (16) or (18), wherein the external data communication terminals serve as a detected flow output terminal.

With this arrangement, the gas flow meter can be reduced in size.

(21) Preferably, a gas flow meter comprising:

a gas flow detection circuit for detecting a current flowing through a resistor installed in a gas passage and a generated voltage and outputting a voltage signal representing a gas flow passing through the gas passage;

a digital conversion circuit for converting the detected gas flow into a digital signal; and a digital adjust circuit for digitally adjusting the digital signal and outputting the adjusted digital signal;

wherein a voltage signal based on the digital signal adjusted by the digital adjust circuit is output, and the digital conversion circuit has a means for selecting either a single-phase input or a differential input.

With this arrangement, the adjust circuit can deal with either a gas flow detection circuit with a single-phase output or a gas flow detection circuit with a differential output

(22) Preferably, a gas flow meter comprising:

a gas flow detection circuit for detecting a current flowing through a resistor installed in a gas passage and a voltage generated across the resistor and outputting a voltage signal representing a gas flow passing through the gas passage;

a digital conversion circuit for converting the detected gas flow into a digital signal;

a digital adjust circuit for digitally adjusting the digital signal and outputting the adjusted digital signal; and an analog conversion circuit for receiving the adjusted digital signal and converting it into an analog signal;

wherein the analog conversion circuit is driven by a voltage based on an external reference voltage and a voltage follower circuit is arranged between a reference voltage terminal and a power supply terminal which drives the analog conversion circuit.

With this arrangement, the digital-analog converter can be operated even when the current supplied from the external reference voltage is small.

BRIEF DESCRIPTION OF THE DRAWINGS

FIG. 29 is a table showing comparison between an example analog adjustment system and an example digital adjustment system of the adjust circuit in the gas flow meter.

DESCRIPTION OF THE EMBODIMENTS

Now, the configurations of a gas flow meter, an integrated circuit and an adjust circuit according to the present invention will be described in detail by referring to the embodiments shown in the accompanying drawings.

Figure 1:
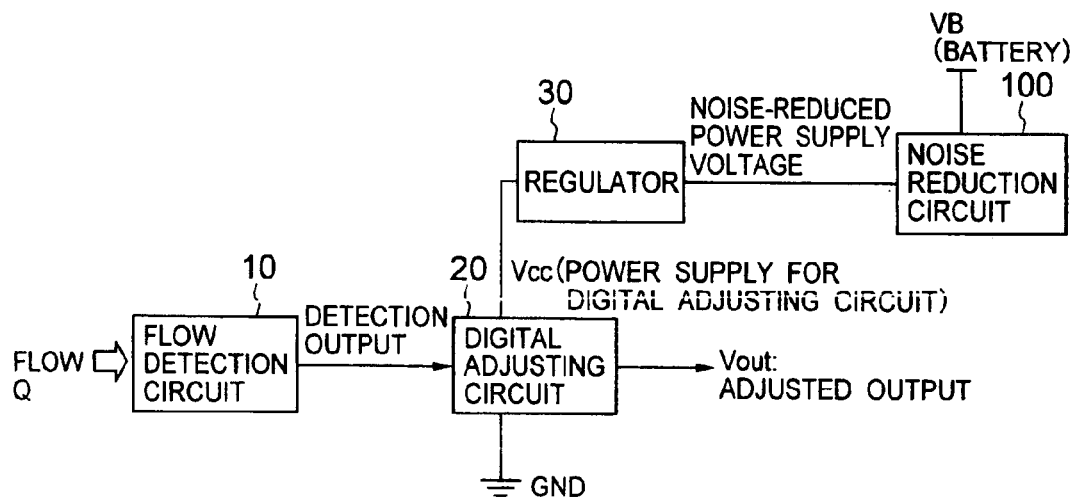
FIG. 1 is an outline circuit configuration of a gas flow meter according to the present invention.

FIG. 1 shows a configuration of the gas flow meter as a first embodiment of the invention. This configuration comprises a gas flow detection circuit 10, a digital adjust circuit 20, a regulator 30 and a noise reduction circuit 100.

The gas flow detection circuit 10 outputs a voltage signal representing a gas flow passing through a gas passage. The gas flow detection circuit 10 may be a gas flow detection circuit DECT1 shown in FIG. 21 which detects a current flowing through a resistor arranged in the gas passage or a voltage across the resistor and outputs a voltage signal representing the gas flow passing through the gas passage.

Figure 29:
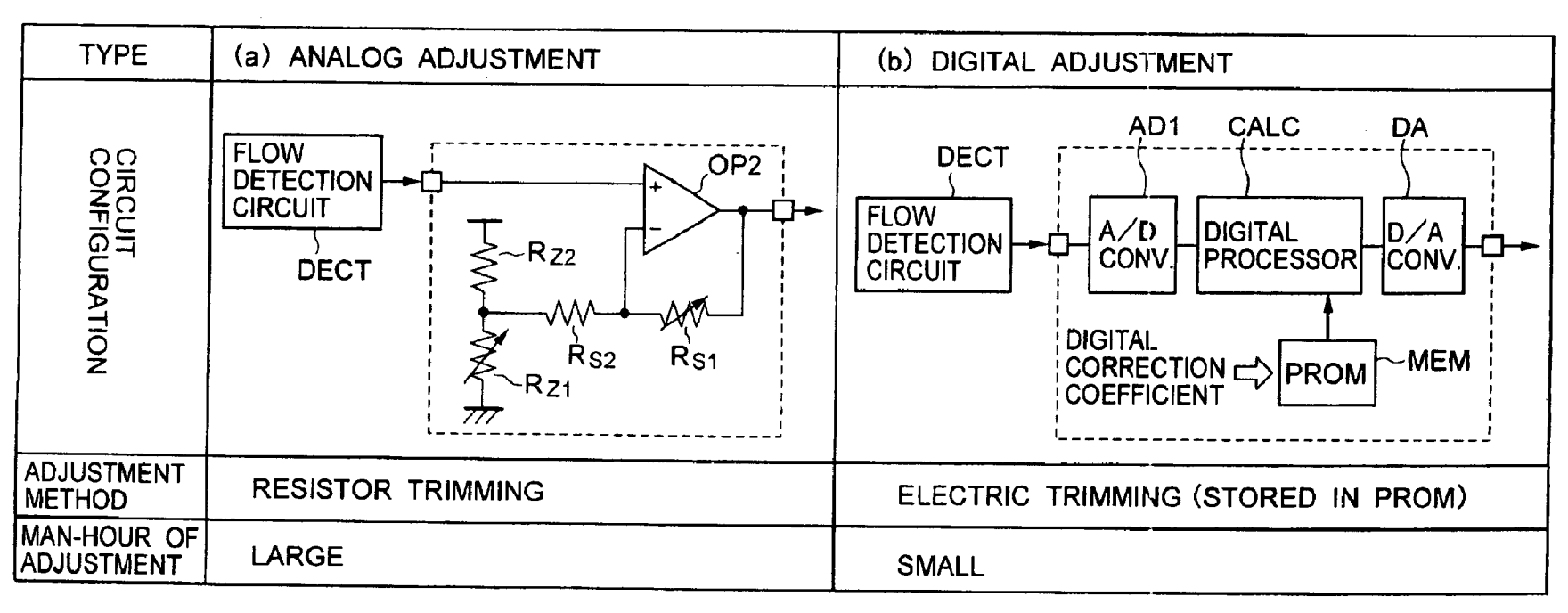

The voltage output is supplied to the digital adjust circuit 20. In an example configuration of the digital adjust circuit 20, as shown in FIG. 29B, the voltage output from the flow detection circuit is converted by an analog-digital converter AD1 into a digital value, which is processed by a digital processor CALC to adjust a zero point and a span. The adjusted zero point and span are converted into an analog signal by a digital-analog converter DA to produce an analog output corresponding to a desired gas flow. The gas flow meter also has the regulator 30 which drives these analog-digital converter AD, digital processor CALC and digital-analog converter DA, and produces a reference voltage for the analog-digital converter AD and the digital-analog converter DA.

The noise reduction circuit 100 is a circuit to reduce surges, overvoltages and high frequency noise and to supply a stable power supply voltage. A part of the digital adjust circuit 20 uses C-MOSs that may be damaged by surges or overvoltages or operate undesirably due to high frequency electromagnetic noise generated by a variety of electronic devices. Hence, the power supply terminal of the digital adjust circuit is connected to the noise reduction circuit 100 through the regulator. A part or all of the digital adjust circuit 20 may use bipolar transistors, and the noise reduction circuit 100 may be connected to various circuits in the gas flow meter.

Figure 2:
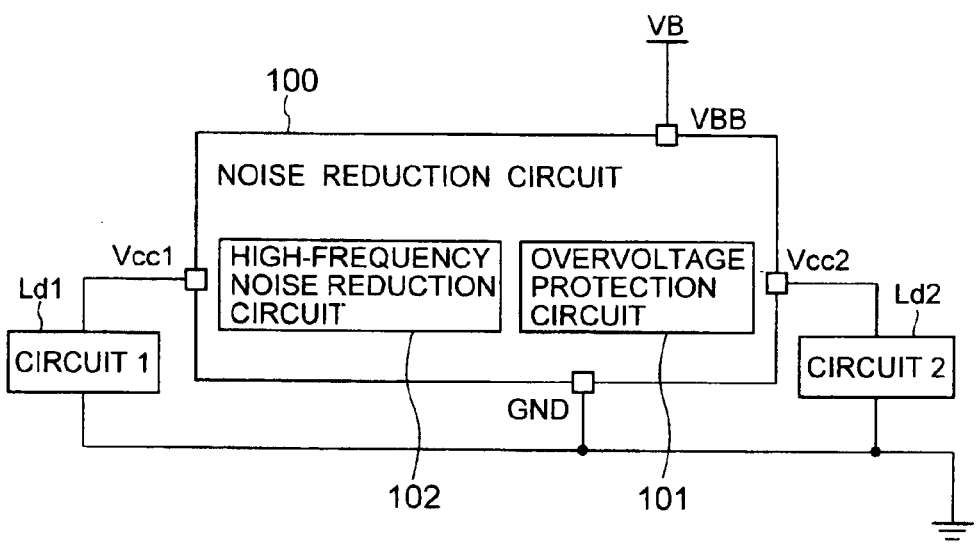
FIG. 2 is an outline circuit configuration of a noise reduction circuit applied to a gas flow meter according to the present invention.

As shown in FIG. 2, the noise reduction circuit 100 comprises an overvoltage protection circuit 101 for protecting the gas flow detection circuit 10 and the digital adjust circuit 20 from surges and overvoltages impressed on the power supply terminal VBB, and a high frequency noise reduction circuit 102 for reducing high frequency noise. The noise reduction circuit 100 supplies a regulated power supply voltage with reduced overvoltages, surges and high frequency noise via two or more terminals to circuits Ld1, Ld2 such as gas flow detection circuit and adjust circuit. When minimum voltages required by the circuits Ld1, Ld2 differ, the voltages supplied through the voltage supply terminals need only be differentiated.

Figure 3:
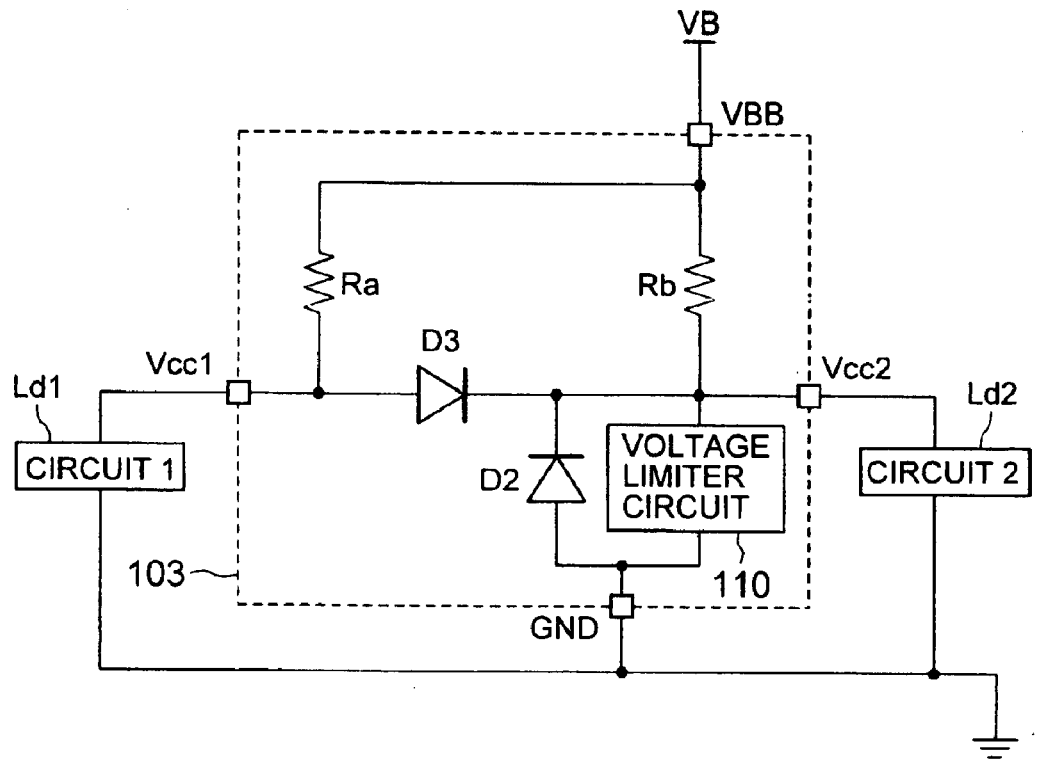
FIG. 3 is an outline circuit configuration of an overvoltage protection circuit used in a gas flow meter according to the present invention.

Next, the overvoltage protection circuit, a part of the noise reduction circuit 100, will be described by referring to FIG. 3.

The overvoltage protection circuit 103 comprises a voltage limiter circuit 110, two current limiting resistors Ra, Rb, and diodes D2, D3. The overvoltage protection circuit 103 receives a DC power (VB) from a car battery not shown via the power supply terminal VBB and the ground terminal GND and then supplies an overvoltage-protected DC power to the circuits Ld1, Ld2 connected to the two voltage supply terminals Vcc1, Vcc2.

The voltage limiter circuit 110, when the voltage exceeds a predetermined value, turns on to pass a current. This circuit has current limiting resistors connected in series to clip an overvoltage such as surge voltage impressed between the power supply terminal VBB and the ground terminal GND to absorb an overvoltage energy.

Figure 4:
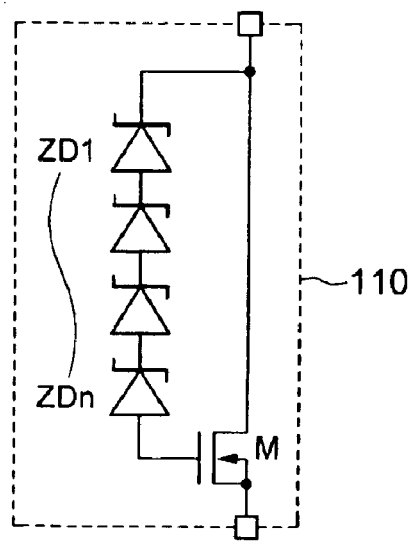
FIG. 4 is an example of a voltage limiter circuit used in the overvoltage protection circuit according to the present invention.

The voltage limiter circuit 110 may use a circuit which, for example, has a certain number of Zener diodes ZD1–ZDn connected in series, as shown in FIG. 4, and also an Nch D-MOS M added to them. In this configuration, the group of Zener diodes ZD1–ZDn, when applied with a voltage higher than a predetermined level, is turned on to turn on the Nch D-MOS M to pass a surge current. This arrangement can reduce the size of the Zener diodes through which almost no current flows, thus contributing a reduction in the circuit size. The Nch D-MOS of the voltage limiter circuit 110 may be replaced with a bipolar transistor, or the voltage limiter circuit may be formed by using only Zener diodes.

Returning to FIG. 3, the diode D3 prevents a current from the resistor Rb from flowing into the circuit Ld1 or a current from the resistor Ra from flowing into the circuit Ld2 and also has a function of supplying different supply voltages from the voltage supply terminals Vcc1, Vcc2.

Figure 5:
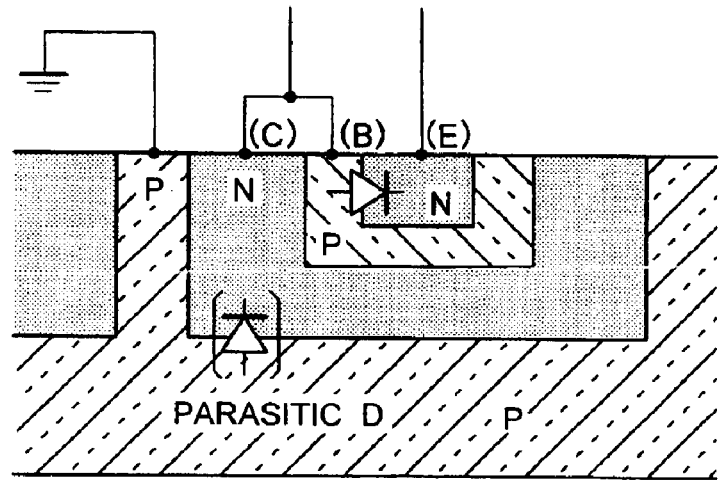
FIG. 5 is an outline circuit configuration of the overvoltage protection circuit used in the gas flow meter according to the present invention.

The diode D3 uses a bipolar transistor with its base and emitter connected, as shown in FIG. 5. This arrangement allows the diode to be fabricated in the same step that the bipolar transistor is made, thus reducing the number of manufacturing steps.

Here, suppose that resistance Ra is larger than resistance Rb. When a positive surge voltage, against which the circuits Ld1, Ld2 are to be protected, is impressed between the power supply terminal VBB and the ground terminal GND, a surge current flows mainly through the current limiting resistor Rb and the voltage limiter circuit 110, thus protecting the circuit Ld2 from the surge. Because of the diode D3, the voltage at the voltage supply terminal Vcc1 is almost equal to that of the voltage supply terminal Vcc2, thus protecting the circuit LD1, too, from the surge.

When a negative surge voltage is applied, the surge current flows through the diode D2 and the current limiting resistor Rb, thus protecting the circuits Ld1, Ld2 from the surge.

Figure 6:
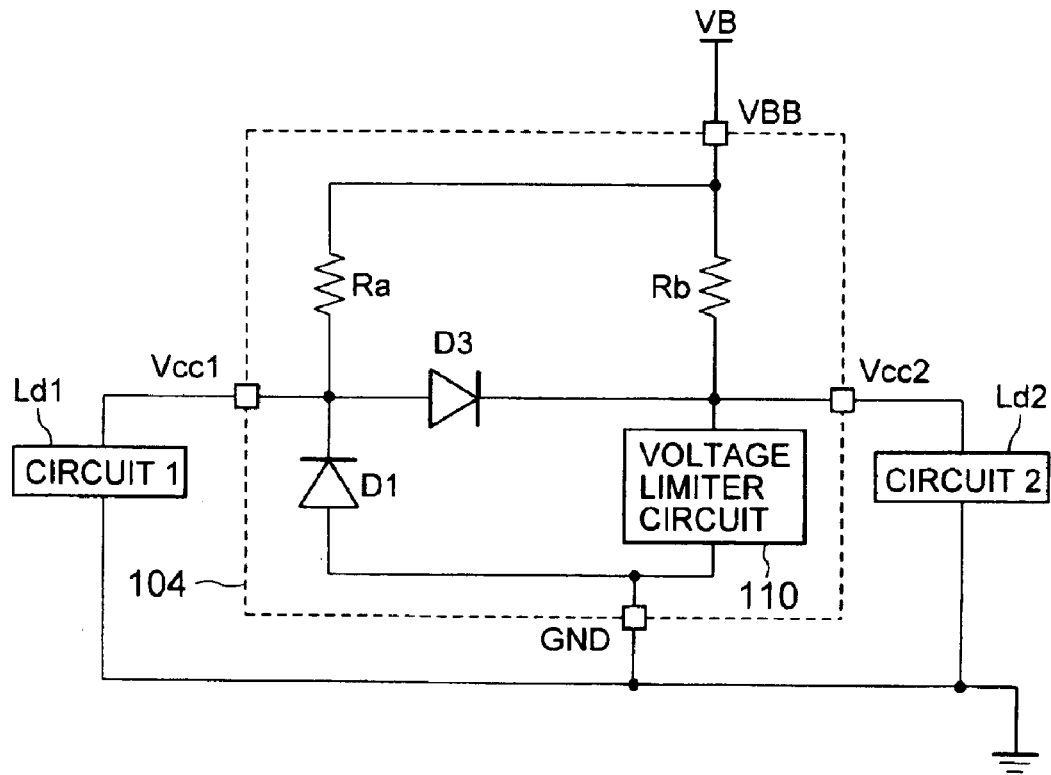
FIG. 6 is an outline circuit configuration of the overvoltage protection circuit used in the gas flow meter according to the present invention.

Another configuration of the overvoltage protection circuit 104 is shown in FIG. 6. This configuration has the diode D2 of FIG. 3 reconnected at the position of the diode D1 of FIG. 6.

When a positive surge voltage, against which the circuits Ld1, Ld2 are to be protected, is applied between the power supply terminal VBB and the ground terminal GND, the surge current flows mainly through the current limiting resistor Rb and the voltage limiter circuit 110, protecting the Ld2 from the surge. The diode D3 renders the voltage at the voltage supply terminal Vcc1 almost equal to that of the voltage supply terminal Vcc2, also protecting the circuit Ld1 from the surge.

As for the negative surge, the surge current flows through the diodes D1, D3 and the current limiting resistor Rb, protecting the circuits Ld1, Ld2 from the surge.

Figure 7:
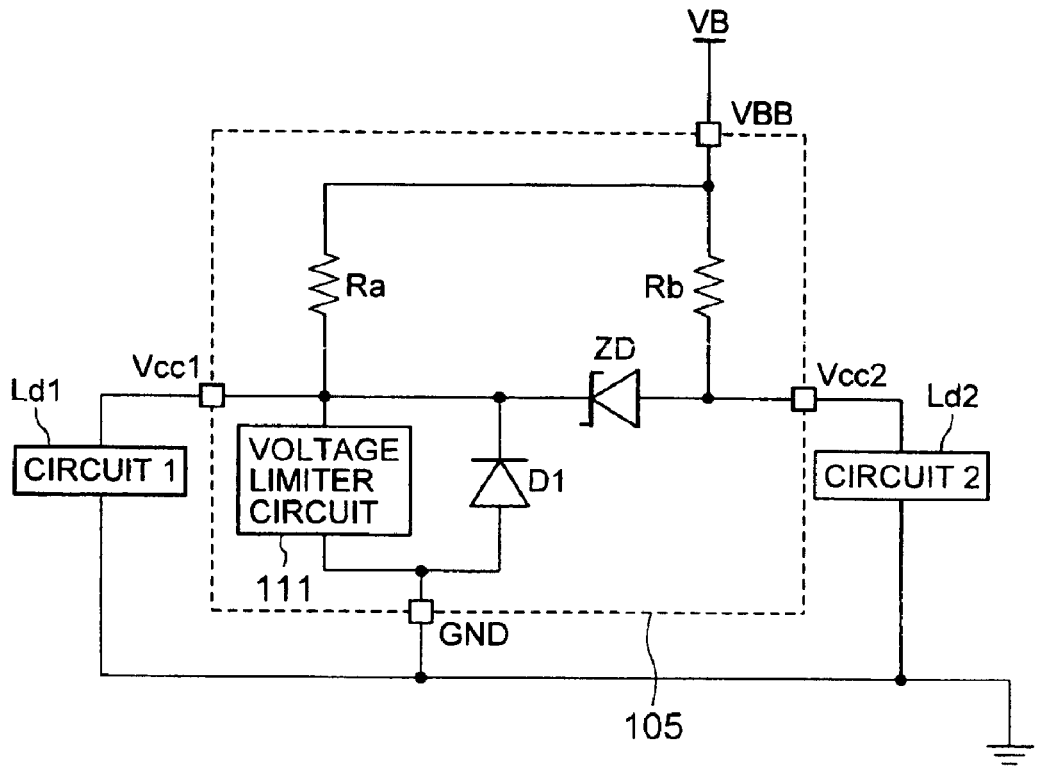
FIG. 7 is an example of a diode used in the overvoltage protection circuit according to the present invention.

Another configuration of the overvoltage protection circuit 105 is shown in FIG. 7. This configuration has a voltage limiter circuit 111 and a diode D1 connected in series with a current limiting resistor Ra, as opposed to FIG. 3, and has a Zener diode ZD connected between the voltage supply terminals Vcc1 and Vcc2.

If a positive surge voltage, against which the circuits Ld1, Ld2 are to be protected, is applied between the power supply terminal VBB and the ground terminal GND, the surge current flows mainly through the current limiting resistor Rb, the Zener diode ZD and the voltage limiter circuit 111, thus protecting the circuits Ld1, Ld2 from the surge.

As for a negative surge, the surge current flows through the diode D1, the Zener diode ZD and the current limiting resistor Rb, thus protecting the circuits Ld1, Ld2 from the surge.

Figure 8:
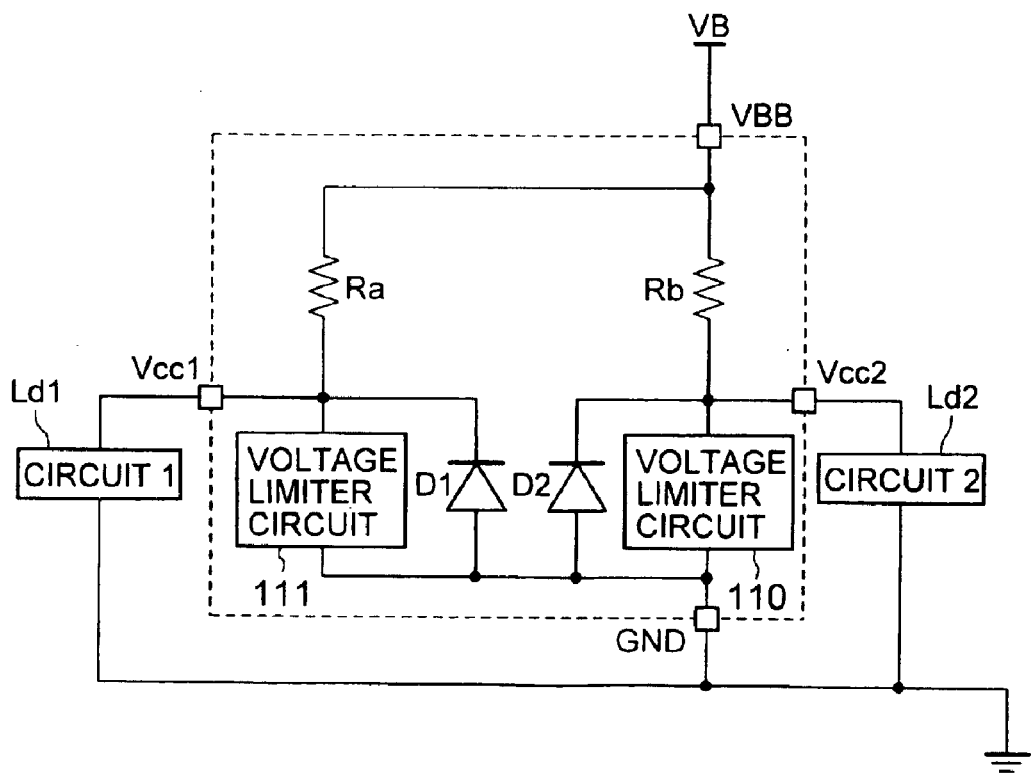
FIG. 8 is an outline circuit configuration of the overvoltage protection circuit used in the gas flow meter according to the present invention.

Still another configuration of the overvoltage protection circuit 106 is shown in FIG. 8. This overvoltage protection circuit 106 comprises voltage limiter circuits 110, 111, two current limiting resistors Ra, Rb, and diodes D1, D2. The overvoltage protection circuit 106 receives a DC power from a car battery not shown through the power supply terminal VBB and the ground terminal GND and supplies an overvoltage-protected DC power to the circuits Ld1, Ld2 connected to the voltage supply terminals Vcc1, Vcc2.

It is assumed that the minimum voltages and minimum currents required for the circuits Ld1, Ld2 differ. The current limiting resistors Ra, Rb normally cause voltage drops as the current flows through the circuits Ld1, Ld2. By increasing the resistances of the current limiting resistors Ra, Rb within the minimum required supply voltage range for the circuit Ld1 and circuit Ld2, the voltage limiter circuit can be reduced in size, which in turn contributes to a reduction in the overall circuit size.

Figure 9:
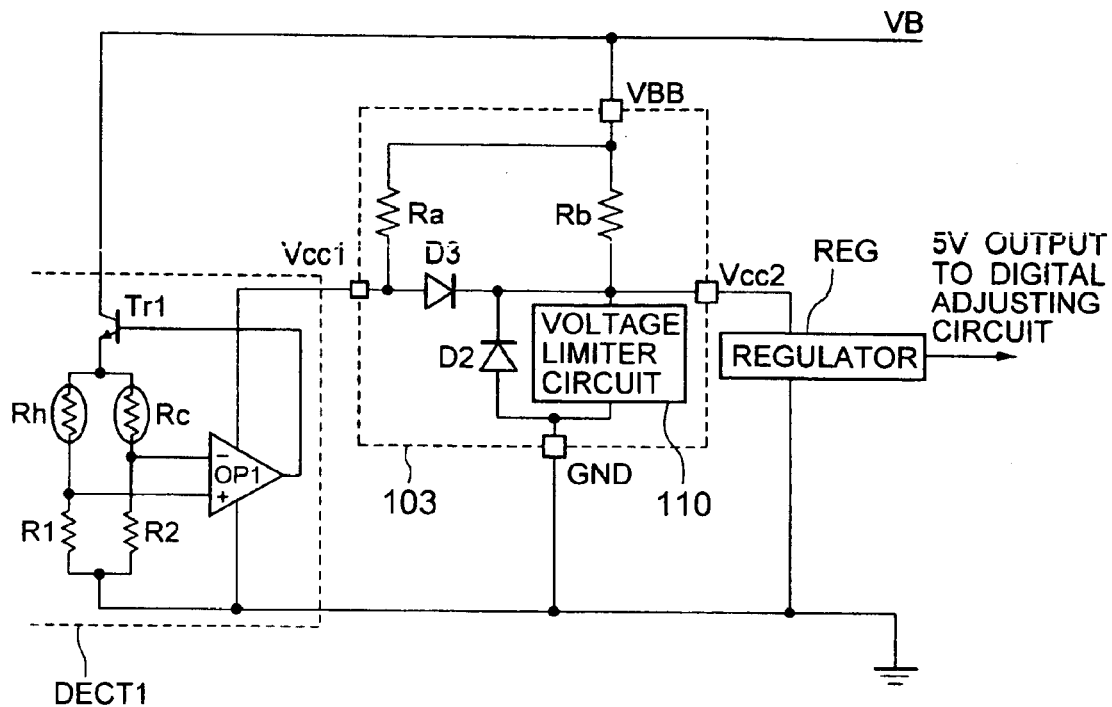
FIG. 9 is an outline circuit configuration of the overvoltage protection circuit used in the gas flow meter according to the present invention.
Figure 25:
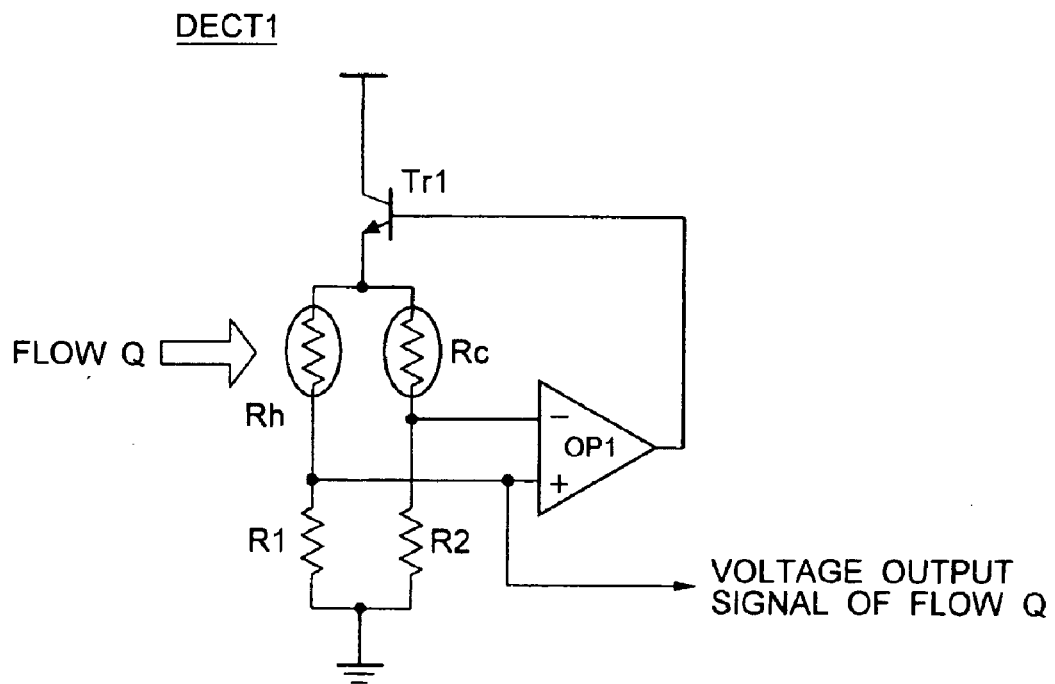
FIG. 25 is a schematic diagram showing an example of the flow detection circuit.

The present invention is suitably applied to a circuit of a gas flow meter that has a digital adjust circuit in particular. One such example is shown in FIG. 9. Here, the overvoltage protection circuit has the configuration 103 of FIG. 3. As the circuit Ld1 of FIG. 3, an operational amplifier OP1, a part of the gas flow detection circuit DECT1 of FIG. 25, is connected. As the circuit of Ld2, a regulator REG is connected that supplies a reference voltage to various parts of the circuit of the gas flow meter.

The operational amplifier OP1 controls a power transistor Tr1, so the current to be supplied to the operational amplifier OP1 may be small (suppose it is about 1.5 mA) but a relatively high voltage is needed to drive the power transistor Tr1. For example, even when the battery voltage is low and the voltage at the power supply terminal VBB is 6 V as during the starting of a car engine, an output of approximately 5.5 V must be able to be produced. As for the regulator REG which supplies voltage to the analog-digital converter AD1 of the digital adjust circuit type (b) shown in FIG. 29, digital processor CALC and digital-analog converter DA, although the current to be supplied to the regulator REG is relatively large (suppose it is about 15 mA), it needs only to produce an output of 5 V at all times even when the voltage at the power supply terminal VBB falls to 6 V.

Figure 28:
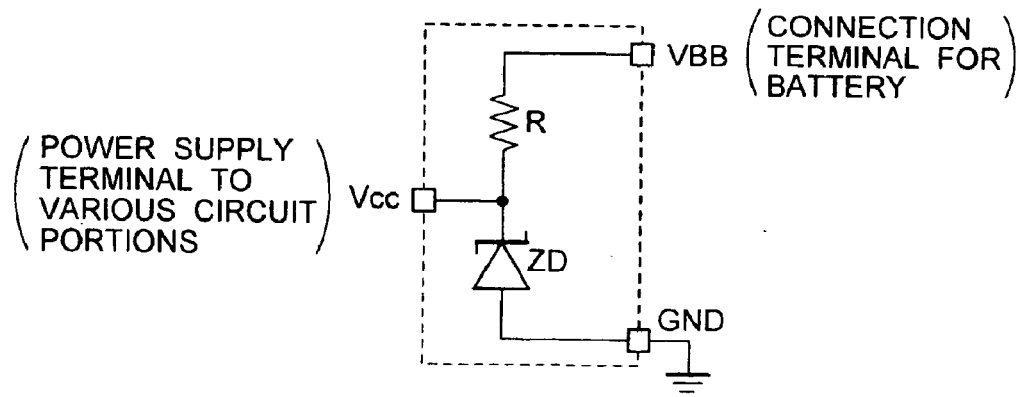
FIG. 28 is an example outline circuit configuration of a conventional overvoltage protection circuit.

Suppose the overvoltage protection circuit has a configuration shown in FIG. 28. When an overvoltage-protected voltage is supplied from one voltage supply terminal to both the operational amplifier OP1 and the regulator REG, the resistance of the current limiting resistor R needs to have 30 ohm from the requirement that the supply voltage is 5.5 V and the supply current is 16.5 mA when the voltage at the power supply terminal VBB is 6 V.

In the overvoltage protection circuit 103 of FIG. 9, the resistance can be made larger than in the general overvoltage protection circuit of FIG. 28. That is, under the condition that the current limiting resistor Ra causes a voltage drop of 0.5 V or less when a current of 1.5 mA flows and that the current limiting resistor Rb causes a voltage drop of 1 V or less when a current of 15 mA flows, the resistor Ra may be set to 250 ohm and the resistor Rb to 50 ohm, for example. Because the current, or energy, flowing through the voltage limiter circuit 110 is reduced, the electrical withstandability required also decreases, making it possible to reduce the voltage limiter circuit 110.

Further, a part or all of the devices contained in these overvoltage protection circuit, flow detection circuit DECT and digital adjust circuit may be integrated into the same IC circuit by using the BCD (bipolar, C-MOS, D-MOS) process to reduce the size and manufacturing cost.

The configuration of the overvoltage protection circuit according to the present invention can be applied in the similar manner if the number of voltage supply terminals Vcc increases to three or more.

Next, the accuracy enhancement in adjusting the sensor output characteristic will be explained by referring to FIG. 10 through FIG. 13 for a case of an example adjustment calculation of the present invention, as compared with a conventional adjustment that adjusts only the zero point and the span.

Figure 10:
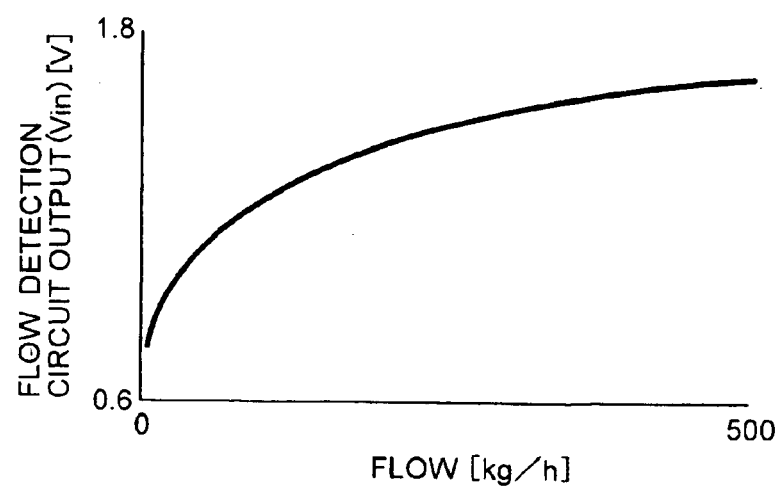
FIG. 10 is an example output characteristic of a gas detection circuit of the gas flow meter.

FIG. 10 shows a gas flow versus output voltage characteristic of the flow detection circuit DECT. The output voltage is adjusted by the adjust circuit to become a narrow line A, an ideal flow-output characteristic, in FIG. 12.

Figure 11:
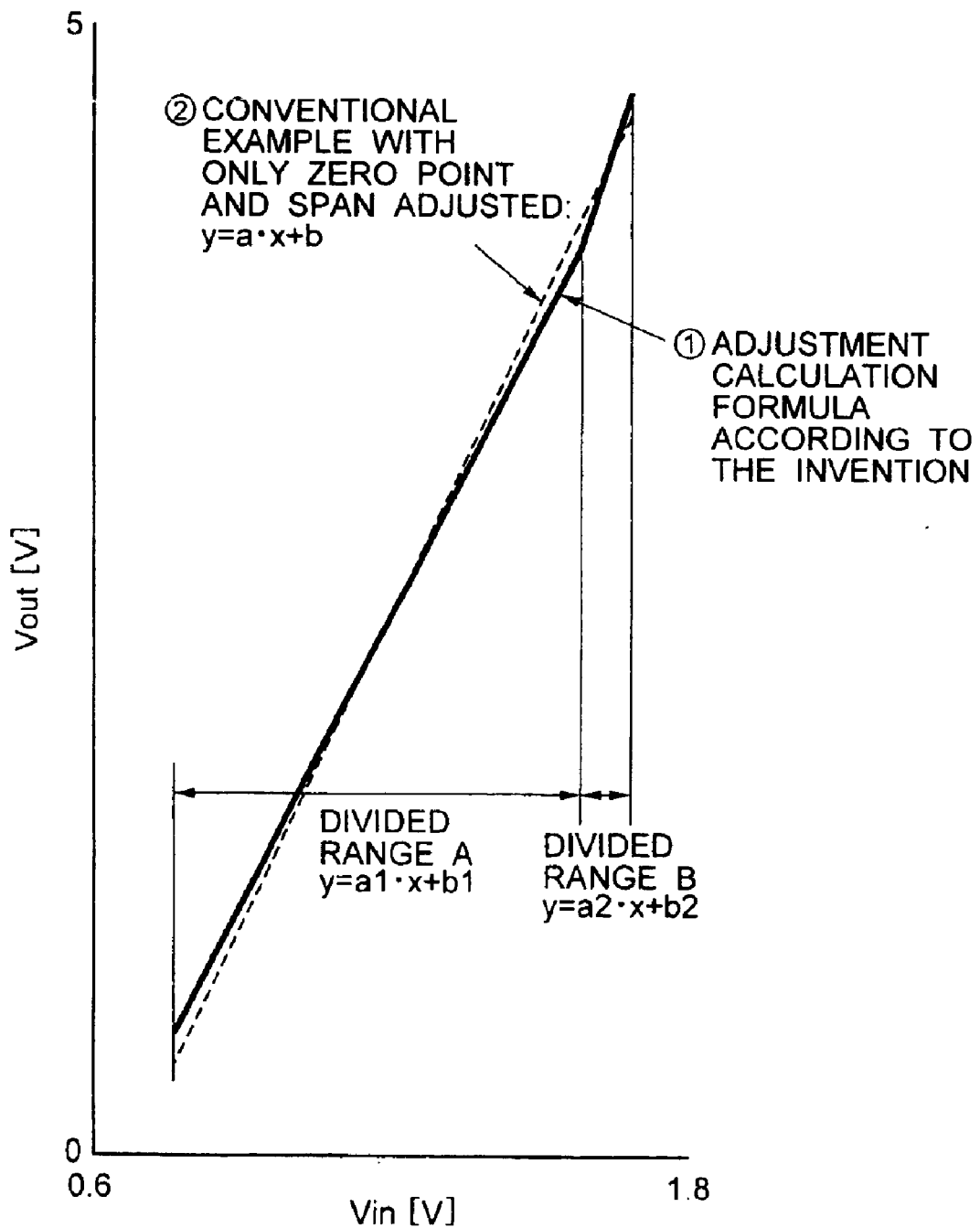
FIG. 11 is an example input/output characteristic of an adjust circuit of the gas flow meter according to the present invention.
Figure 12:
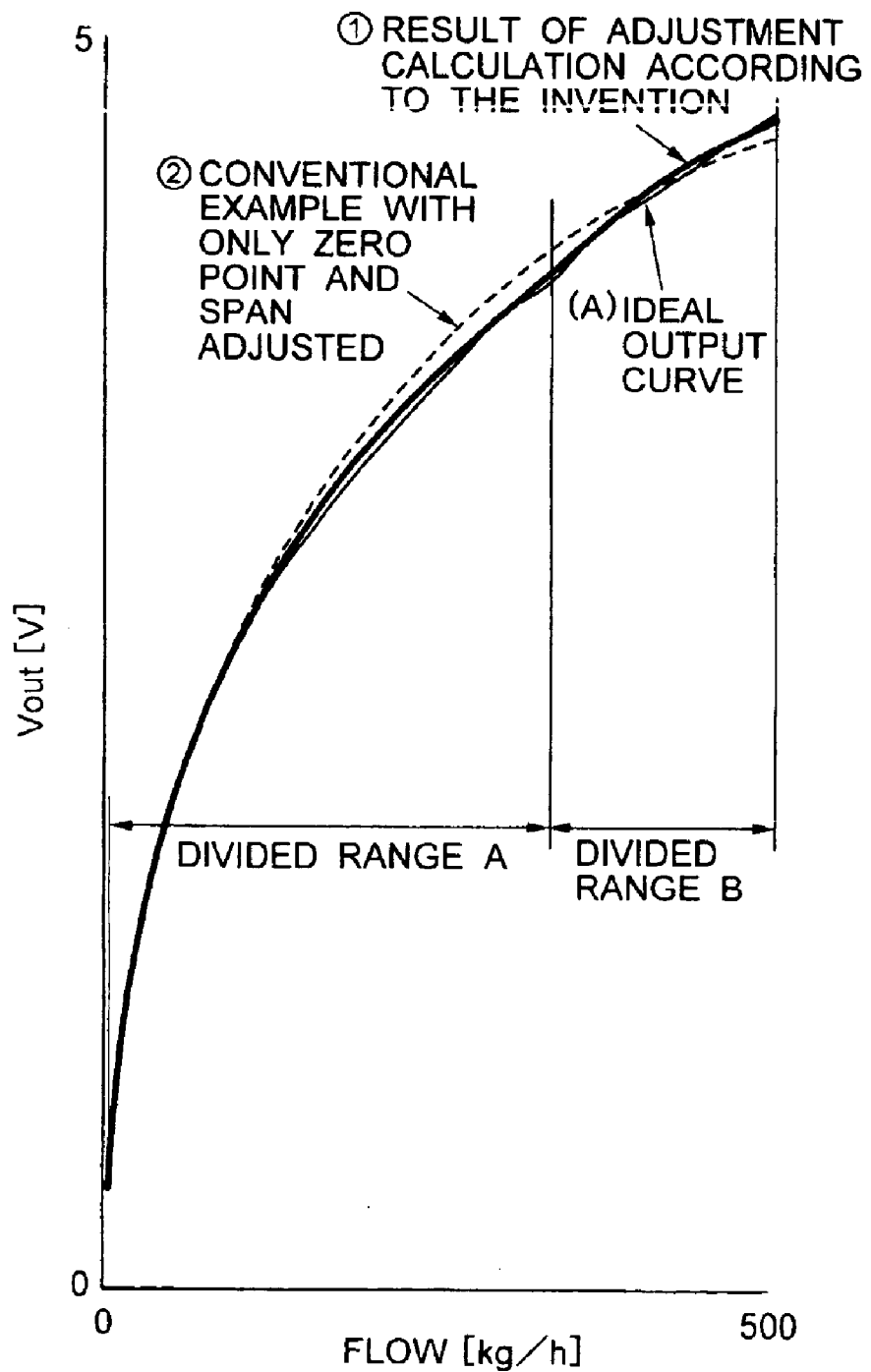
FIG. 12 is an example of an adjusted output characteristic of the gas flow meter according to the present invention.
Figure 13:
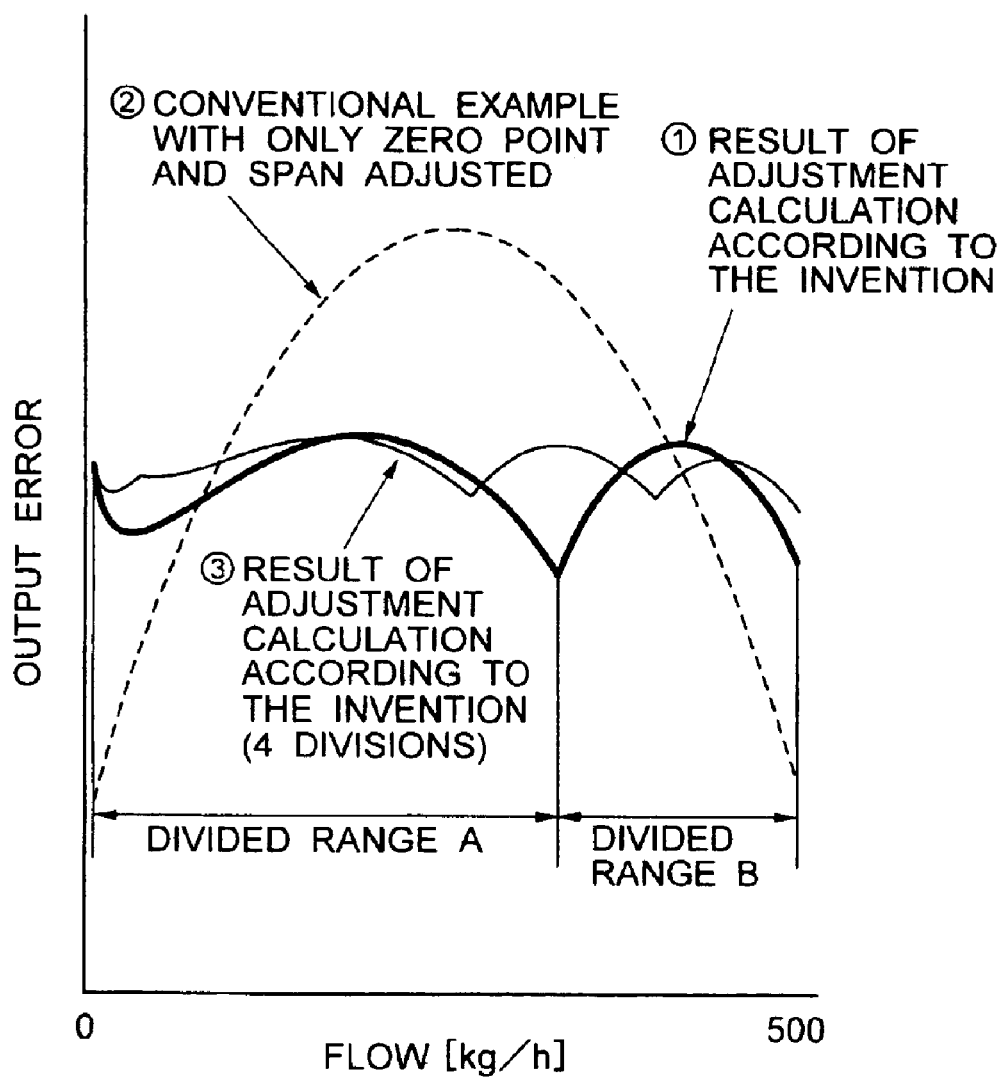
FIG. 13 is an error of the adjusted output characteristic of the gas flow meter according to the present invention.

First, in a conventional example (2) represented by a dotted line in which only the zero point and span are adjusted, the adjustment calculation formula in FIG. 11 used by the adjust circuit is a linear relationship irrespective of the voltage value entered. When, by using the input/output characteristic of this adjust circuit, the flow-output voltage characteristic of the flow detection circuit in FIG. 10 is adjusted, the characteristic will be as shown by a curve (2) in FIG. 12. An error from the ideal output characteristic is shown at (2) in FIG. 13. In an example of adjustment calculation according to the present invention (1), as shown in FIG. 11, the input/output characteristic of the adjust circuit has its input range of voltage signal divided in two and defines different adjustment calculation formulas in different divided ranges A, B (in this example, the simplest first-degree equations). Adjusting the flow-output voltage characteristic of the flow detection circuit of FIG. 10 by using the input/output characteristic of this adjust circuit results in a curve (1) of FIG. 12. When the error from the ideal output (A) is shown superimposed on the conventional case (2) in FIG. 13, it is seen that the adjustment error (1) is reduced.

While in this example the input range of voltage signal entered is divided in two, the simplest division number, it is possible to increase the division number and define an adjustment calculation formula in each divided range for further reduction in the adjustment error. For example, when it is divided into four, the characteristic curve will be as shown at (3) in FIG. 3. The adjustment calculation formula of second or higher degree may be used to reduce the adjustment error. This, however, raises a problem of an increased circuit size and, in digital calculation, a longer calculation time.

Further, although in this example the error is discussed as a characteristic of a quadratic function, this invention can be applied to those errors that are characteristics of a third- (or higher) degree function by increasing the division number to reduce the adjustment error.

Such an adjust circuit can easily be realized by constructing the adjust circuit in a digital form. An example of the digital adjust circuit is shown in (b) of FIG. 29.

Figure 26:
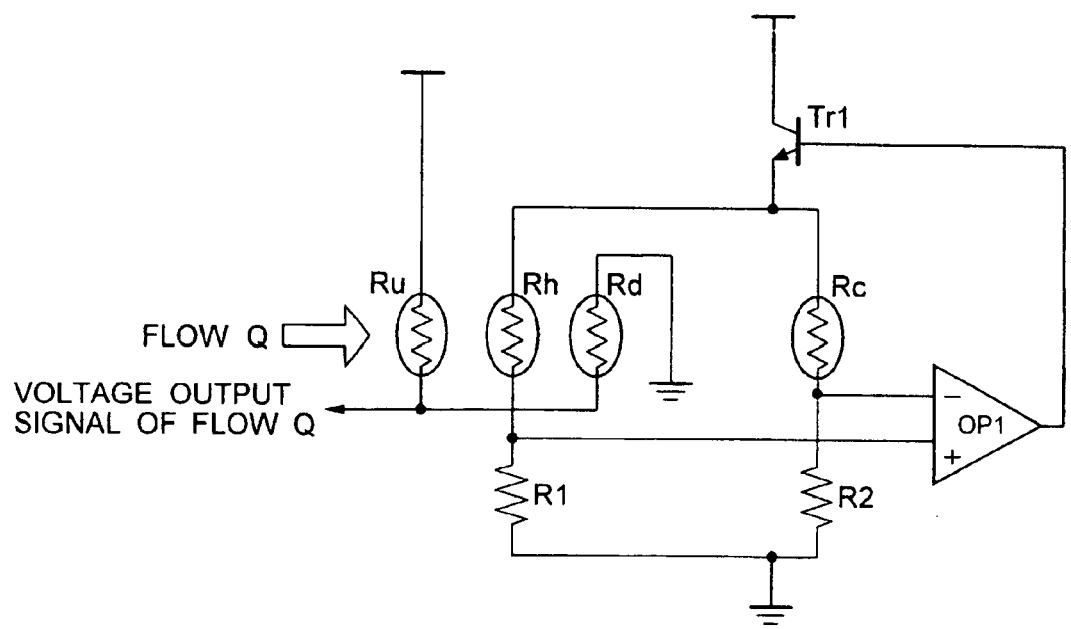
FIG. 26 is a schematic diagram showing an example of the flow detection circuit.

This digital adjust circuit converts the voltage output of the flow detection circuit DECT1, DECT2 of FIG. 25 and FIG. 26 into a digital value by the analog-digital converter AD1, adjusts the output characteristic by the digital processor CALC, and produces an analog output by the digital-analog converter DA. Programs for controlling the digital processor CALC and for adjustment calculation, adjustment coefficients for adjustment calculations, and data temporarily stored during calculation are stored in a storage device MEM, such as read only memory ROM, programmable read only memory PROM, electrically erasable & programmable read only memory EEPROM, and random access memory RAM.

For an arbitrary function y=f(x) that can be differentiated, when a is a constant and |x−a| is very small, the function can be expressed, from the theorem of average value, as f(x)=f(a)+f'(a)(x−a). That is, in a very small range of x an arbitrary function can be replaced with a first-degree function.

If we let $$Dout = f(Din) \quad (1)$$

then, for each small range of Din, the equation (1) can be rewritten as $$Dout = A \cdot Din + B \quad (2)$$

However, because it is not realistic to give a linear equation for all Din and because almost the same linear equation adjustment calculation formula can be used in some Din ranges, the axis of Din is divided into n segments at dividing points Din(1), Din(2), . . . , Din(n). For each divided segment, the following linear equation adjustment calculation formula is given:

$$Dout = \begin{cases} A(1) \cdot Din + B(1) & (Din(1) \leq Din < Din(2)) \\ A(2) \cdot Din + B(2) & (Din(2) \leq Din < Din(3)) \\ M & M \\ A(n) \cdot Din + B(n) & (Din(n) \leq Din) \end{cases} \quad (3)$$

Figure 14:
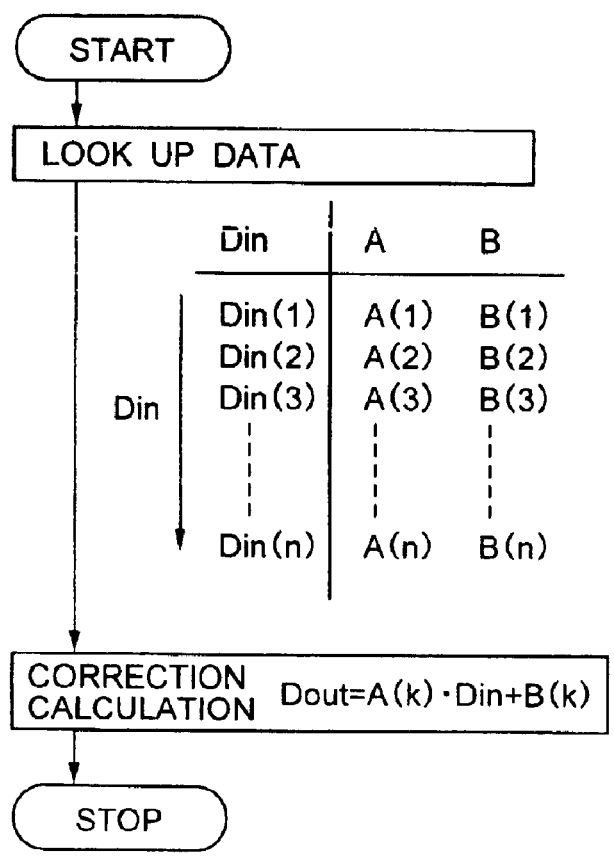
FIG. 14 is a flow chart representing an adjustment calculation used by the gas flow meter according to the present invention.

A calculation flow chart based on the above formula is shown in FIG. 14. First, from Din entered into the digital processor CALC, a search is made for k that satisfies Din(k)≦Din<Din(k+1). Next, coefficients A(k) and B(k) are retrieved from the storage device MEM and the calculation is performed by the digital processor CALC according to the adjustment calculation formula (3) to adjust the output.

Here, it is assumed that the number of dividing points n is 2 raised to the ith power. The digital value Din is expressed in m-bit binary number (m=n+1 or more). As for the dividing point, high order i bits are arbitrary values and the remaining low order (m−i) bits are all 0. That is, Din(k) is $$\begin{array}{ll} i \text{ bits} & (m-i) \text{ bits} \\ \overline{Din(1) =} & 000\ 00\ \cdots\ 00 \\ Din(1) = & 001\ 00\ \cdots\ 00 \\ \cdots \\ Din(n) = & 111\ 00\ \cdots\ 00 \end{array} \qquad (4)$$

That is, the division intervals are equal. To adjust the sensor output, if the high order i bits of Din are k (binary notation), then the Din will always be $$Din(k) \leq Din < Din(k+1)$$

Hence, the coefficients of the adjustment calculation formula are A(k) and B(k). That is, what is required is to retrieve A(k) and B(k) having high order i bits of Din as label from the storage device and to perform the adjustment calculation by the digital processor CALC.

With this retrieval method, the search time does not change even when the division number increases. This method therefore is particularly effective where the number of divisions is large.

As for the measurement during the adjustment of the gas flow meter before the adjustment value is written, there is no need to take measurements at all n measuring points and it is possible to take measurements at arbitrary points, determine n adjustment coefficients A(k) and B(k) by interpolation and write them.

Figure 15:
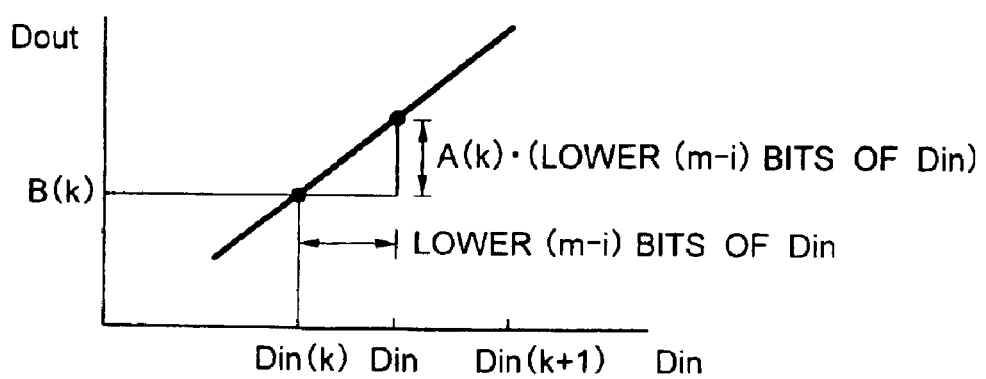
FIG. 15 is a diagram showing a principle of the adjustment calculation used by the gas flow meter according to the present invention.

A straight line for linear approximation using this uniform division has a relationship as shown in a graph of FIG. 15. That is, by using the remaining low order (m−i) bits excluding the high order i bits used for retrieval in some segments of Din, the following adjustment calculation formula (5) can be used to reduce the possibility of overflow.

$$Dout = A \cdot (\text{lower order } (m-i) \text{ bits of } Din) + B \qquad (5)$$

There is a fourth-degree relationship as shown in FIG. 10 between the flow Q and the voltage output V produced by the current detection resistor Rc of the gas flow detection circuit DECT. If a necessity arises to produce a linear output characteristic as defined by V∝Q, it is possible to increase the number of divisions and represent the fourth-degree equation by a linear approximation. In the case of this gas flow meter, the error between the fourth-degree equation and the linear approximation is about 3% for 16 divisions, about 0.8% for 32 divisions, about 0.2% for 64 divisions, and about 0.05% for 128 divisions. Increasing the division number naturally reduces the error produced by the linear approximation of the quartic equation and approaches a linear output characteristic for the flow Q. Considering the error tolerated for the output characteristic of the gas flow meter, the division number is preferably 32 or more.

Next, the adjustment of a temperature characteristic will be explained.

A temperature characteristic of the gas flow meter, i.e., changes in output characteristic due to temperature variations, may be classified largely into two types: an intake air temperature characteristic in which a circuit board temperature remains constant while the gas temperature changes; and a circuit board temperature characteristic in which the gas temperature remains constant while the circuit board temperature changes (also called a module temperature characteristic). Here let us explain about the adjustment of the circuit board temperature characteristic. As for the intake air temperature characteristic, the output variations can be minimized by appropriately setting resistances of the heating resistor Rh and gas temperature measuring resistor Rc in the gas flow detection circuit DECT1, a resistor temperature coefficient (TCR), and resistances of resistors R1, R2. The intake air temperature characteristic has a flow dependency and is difficult to eliminate completely. So, by deliberately providing the circuit board temperature characteristic with a reverse characteristic for the intake air temperature characteristic, the overall temperature characteristic for the gas flow meter can be set to zero.

The circuit board temperature characteristic is mainly determined by a temperature characteristic of the output voltage of the regulator that supplies a reference voltage to the analog-digital converter AD and the digital-analog converter DA.

Figure 16:
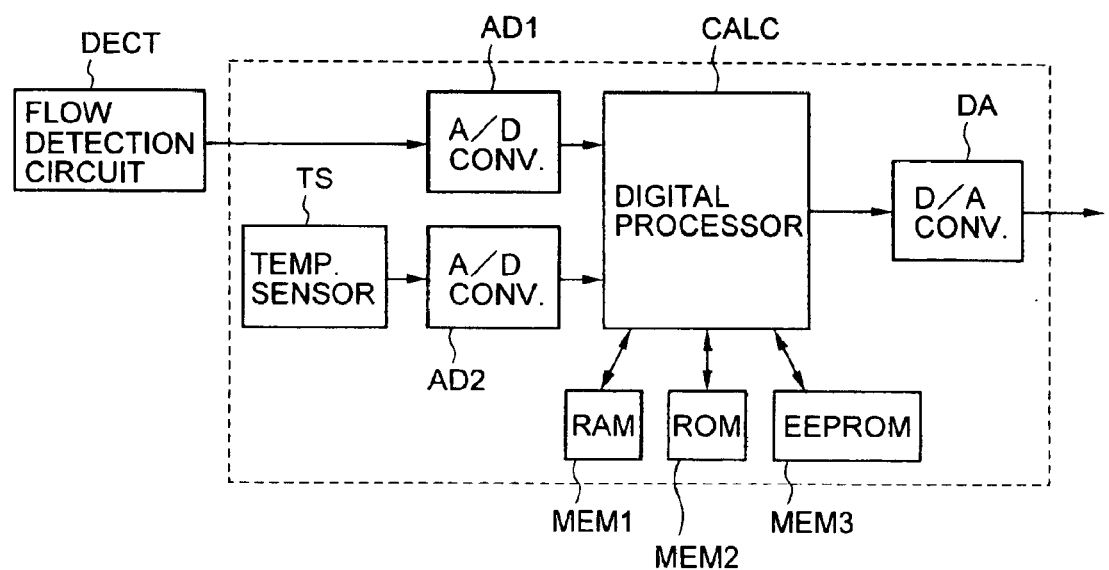
FIG. 16 is an outline circuit configuration of the adjust circuit used in the gas flow meter according to the present invention.

An outline configuration of the circuit for adjusting the temperature characteristic is shown in FIG. 16. Added to the digital adjust circuit shown in (b) of FIG. 29 in order to adjust the temperature characteristic are a temperature sensor TS and an analog-digital converter AD2 for converting the output of the temperature sensor into a digital value. The converted digital value is entered into the digital processor CALC.

Figure 17:
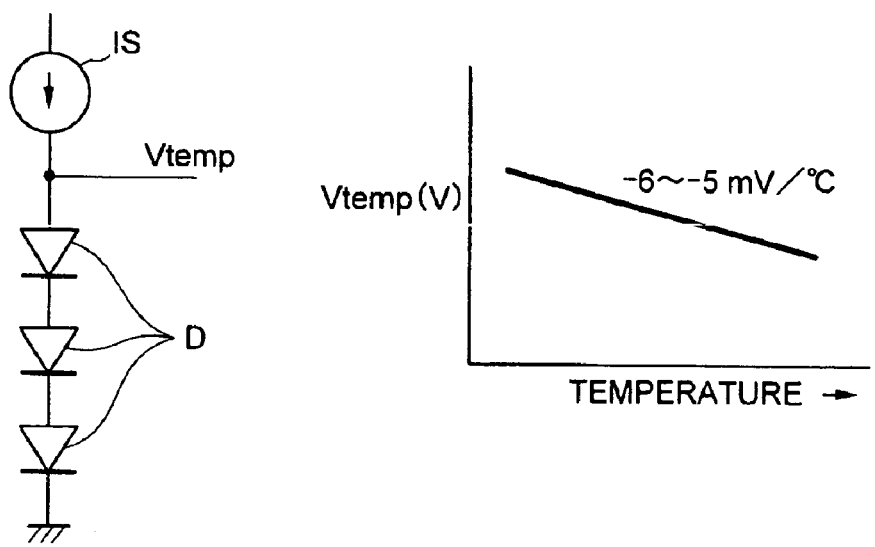
FIG. 17 is an example of a temperature sensor circuit.

The temperature sensor TS necessary for the adjustment of a temperature characteristic is arranged close to the regulator that has a temperature characteristic. An example configuration of the temperature sensor is shown in FIG. 17, in which a constant current source IS and one to several diodes D are used. When three diodes are connected in series, for example, the output changes with temperature variations at a rate of about −6 to −5 mV/° C. exhibiting a good linearity.

Further, if the supply voltage of the regulator is set to change linearly with respect to temperature variations, the temperature adjustment needs only to have a linear expression.

Figure 18:
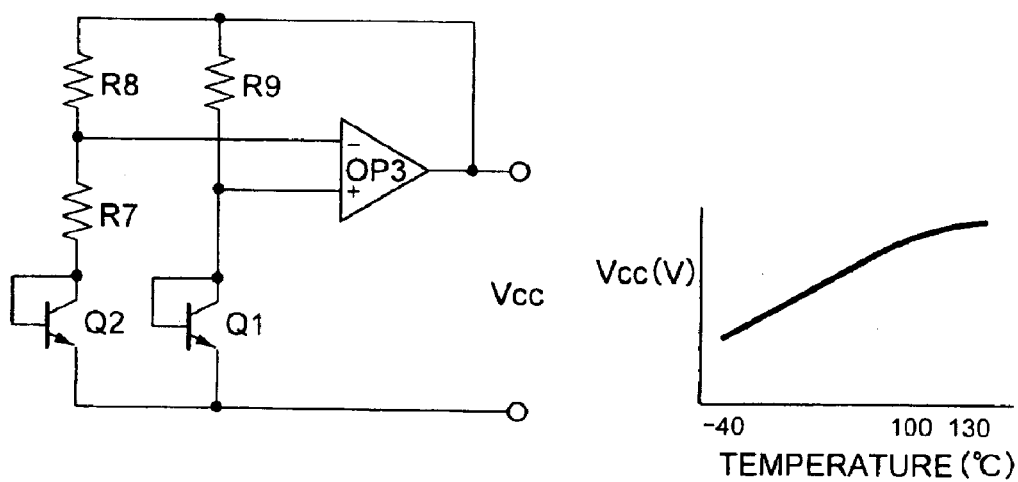
FIG. 18 is an example of a regulator circuit.

Such a regulator can be realized by using a band gap reference power supply circuit (band gap voltage source circuit). The outline configuration of this circuit is shown in FIG. 18. The regulator has two diode-connected transistors Q1, Q2, an operational amplifier OP3, and resistors R7, R8, R9. By using the operational amplifier OP3, the currents flowing through the transistors Q1, Q2 can be made to have a constant ratio determined by the resistances of resistors R8, R9. At this time, the output voltage of the operational amplifier OP3 stabilizes in such a way that the sum of the base-emitter voltage of the transistor Q2 and the voltage drop of the resistor R7 is equal to the base-emitter voltage of the transistor Q1. The voltage drop of the resistor R7 is equal to the difference in the base-emitter voltage between the transistor Q2 and the transistor Q1 and is proportional to a thermal voltage $V_T = kT/q$. So, the currents flowing through the resistors R8, R9 and the transistors Q2, Q1 have a linear positive temperature characteristic. Generally the base-emitter voltage has a negative temperature characteristic. Hence, the reference voltage, which is an output of the band gap reference power supply circuit and equal to the sum of the base-emitter voltages of the transistors Q2, Q1 and the voltage drop of the resistor R7 proportional to the thermal voltage $V_T$, can set a linear temperature coefficient by changing the resistances of the resistors R7, R8, R9. In practice, elements in the band gap reference power supply circuit have slightly non-linear temperature coefficients, so the output voltage of this reference power supply circuit has a characteristic slightly non-linear for temperature variations on the high temperature side.

Since the output of the temperature sensor TS and the supply voltage of the regulator that supplies a reference voltage have a linear temperature characteristic for the temperature variations, the temperature characteristic adjustment needs only to add a linear temperature adjustment term to the adjustment terms of A and B in the adjustment calculation formula (2) for Din. That is, the temperature characteristic adjustment can be given by the following equation (6) with a, b, c and d as coefficients.

$$Dout = (a \cdot Dtemp + b) \cdot Din + (c \cdot Dtemp + d) \quad (6)$$

The adjustment calculation formula therefore is given as follows by combining and rewriting the equations (3) and (4) with a(k), b(k), c(k) and d(k) as coefficients.

$$Dout = \begin{cases} (a(1) \cdot Dtemp + b(1)) \cdot Din + (c(1) \cdot Dtemp + d(1)) & (Din(1) \leq Din < Din(2)) \\ (a(2) \cdot Dtemp + b(2)) \cdot Din + (c(2) \cdot Dtemp + d(2)) & (Din(2) \leq Din < Din(3)) \\ \vdots & \vdots \\ (a(n) \cdot Dtemp + b(n)) \cdot Din + (c(n) \cdot Dtemp + d(n)) & (Din(n) \leq Din) \end{cases} \quad (7)$$

To adjust the output of the sensor, a search is made for k that satisfies $Din(k) \leq Din < Din(k+1)$ as in the flow chart of FIG. 14, coefficients in the adjustment calculation formula a(k), b(k), c(k) and d(k) are retrieved from the storage device, and the calculation is performed by the digital processor CALC according to the adjustment calculation formula (7) to adjust the output.

To further simplify the adjustment for temperature variations, the adjustment calculation formula (6) may be replaced with the following formula with C and D as coefficients.

$$Dout = (C \cdot Dtemp + D) \cdot (A \cdot Din + B) \quad (8)$$

This formula first performs the adjustment calculation related to the flow before performing the adjustment calculation for the temperature.

Figure 19A:
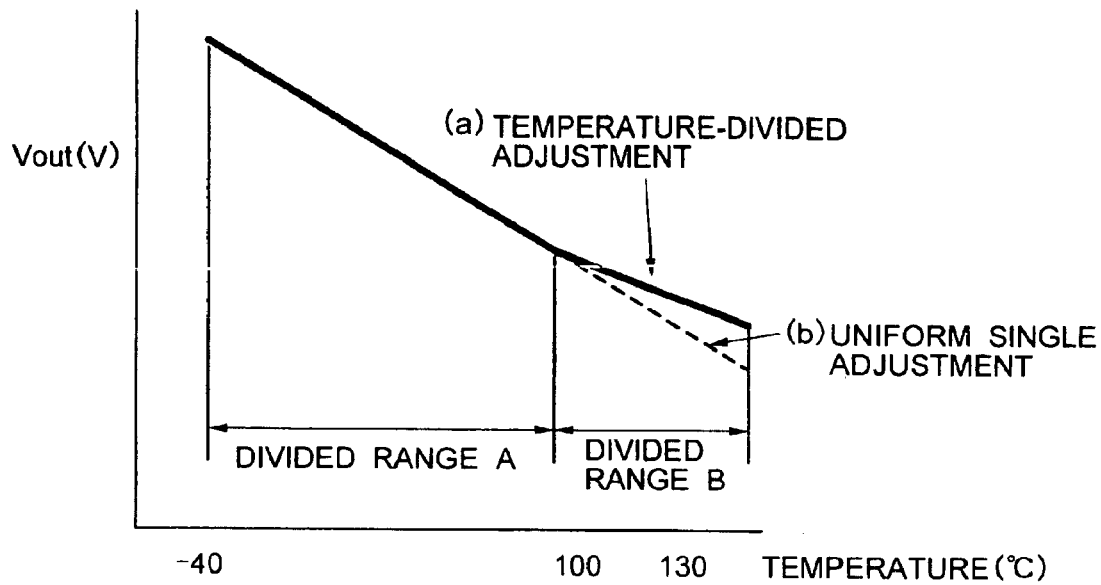
FIG. 19A and FIG. 19B are examples of temperature-characteristic-adjusted output characteristics of the gas flow meter according to the present invention.
Figure 19B:
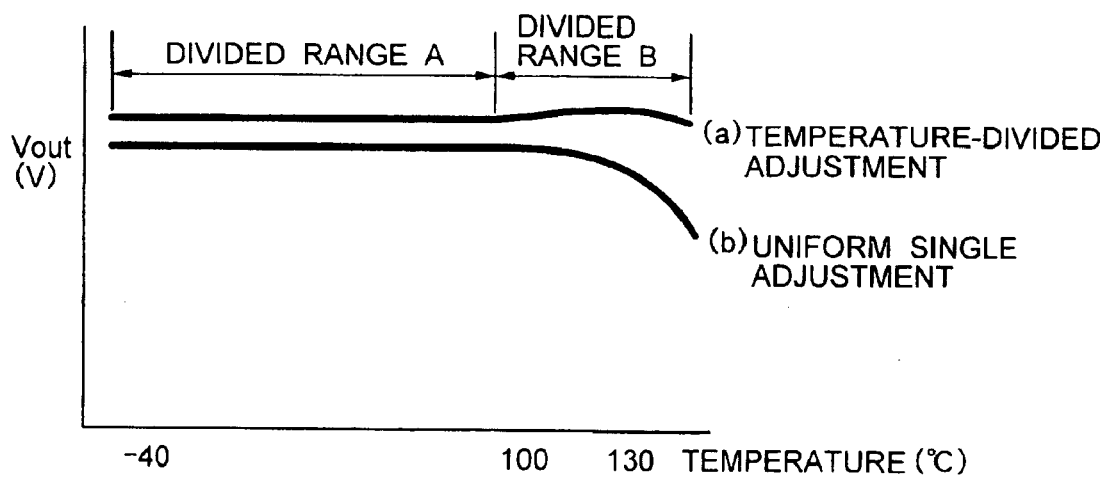

Further, because the regulator has a slightly non-linear temperature characteristic, the calculation formula may be changed according to the output value of the temperature sensor as in the flow adjustment, in order to improve the adjustment accuracy for the temperature characteristic. An example of this method is shown in FIGS. 19A and 19B. A case (a) where the calculation formula is changed according to the output value of the temperature sensor (here, the temperature range is divided in two) is compared with another case (b) where one adjustment formula is applied over the entire output range. Here it is assumed that the input value to the adjust circuit is constant, i.e., the intake air temperature characteristic is zero and the flow is constant. The adjustment calculation formulas are shown in FIG. 19A for the temperature characteristic of the regulator shown in FIG. 18. From FIG. 19B, which shows the output characteristics after being adjusted based on the temperature characteristic, it is seen that the error is reduced.

The calculation formula for the temperature characteristic adjustment may be of second-degree or higher. It is also possible to add a gas temperature sensor and an analog-digital converter and perform the adjustment calculation similar to the above to adjust the intake air temperature characteristic.

If rewritable storage devices such as EEPROM are used for storing the adjustment coefficients, gas flow meters can be taken out from unused motor vehicles and the output specifications changed to enable their use on various types of motor vehicles. In the present manufacturing process, the adjustment procedure involves first supplying a gas before adjustment, determining the amount of adjustment on the output characteristic, performing the adjustment, and then verifying the characteristic. If an EEPROM is used, it is written with an adjustment coefficient in advance and only those gas flow meters that failed the characteristic verification test need to be adjusted again. That is, the use of the EEPROM enhances the level of reuse and offers the advantage of reducing the manufacturing cost.

Figure 20:
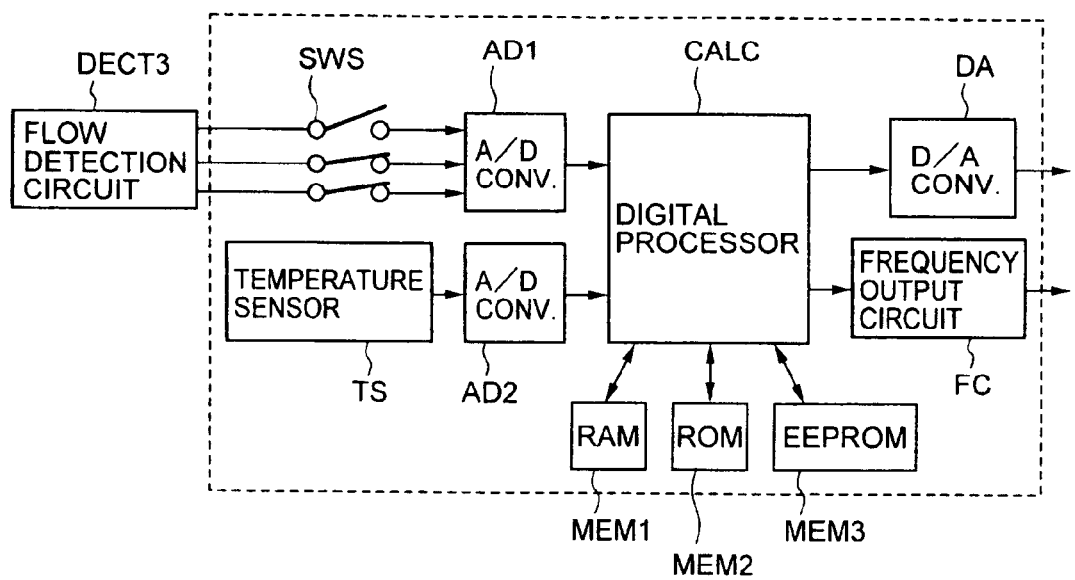
FIG. 20 is an outline circuit configuration of the adjust circuit used in the gas flow meter according to the present invention.
Figure 27:
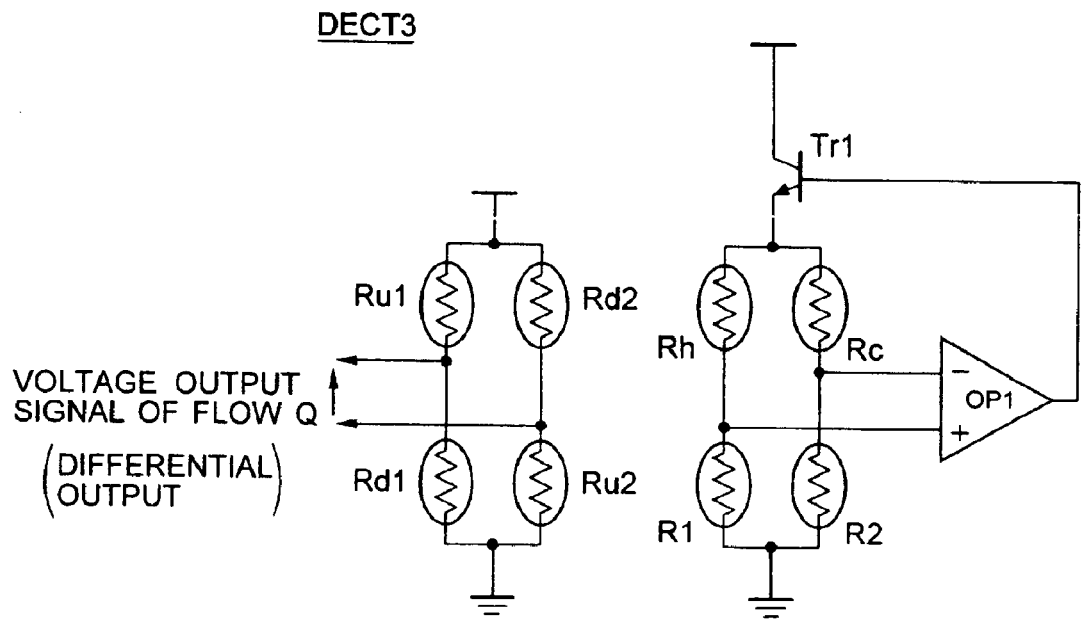
FIG. 27 is a schematic diagram showing an example of the flow detection circuit.

A digital adjust circuit as shown in FIG. 20 is also possible. This circuit is almost similar to that of FIG. 16 except that the differential output type flow detection circuit DECT3 of FIG. 27 is connected to the analog-digital converter AD1. Further, this circuit has a group of switches SWS to switch between a single-phase input and a differential input so that the flow detection circuits DECT1, DECT2 shown in FIG. 25 and FIG. 26 can also be connected. Further, a frequency output circuit FC is also added as an output circuit. The adjustment calculation can be performed in the similar manner.

Figure 21:
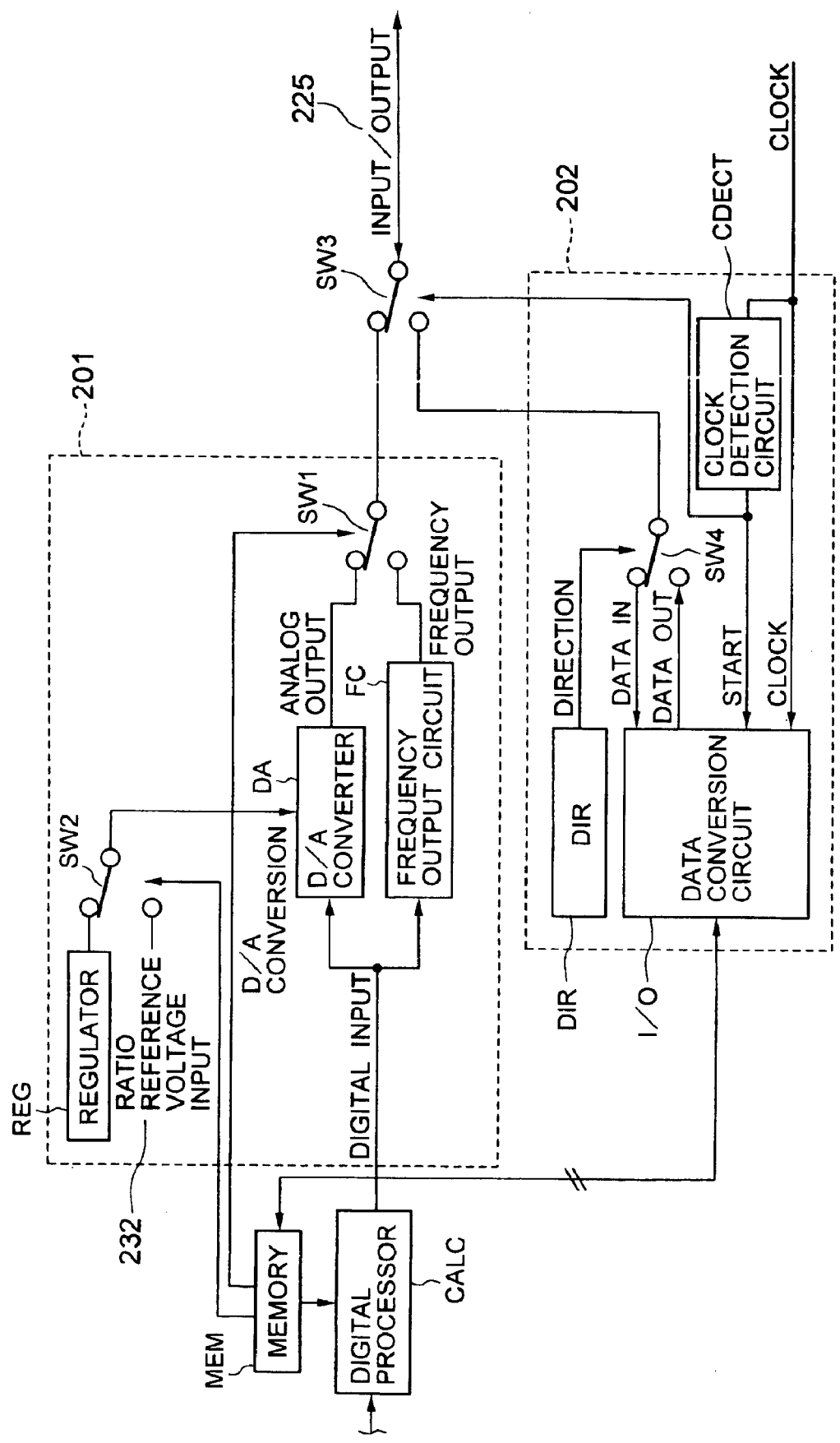
FIG. 21 is an outline circuit configuration of a data communication input/output circuit and a sensor output circuit, both used in the gas flow meter of the present invention.

Next, FIG. 21 shows one embodiment of a circuitry according to this invention which is capable of reducing the number of flow signal output terminals used in the gas flow meter and the number of input/output terminals used for data communication with the storage device in which adjustment data is written; of outputting as a flow signal output of the gas flow meter one of a ratiometric analog output, a non-rationmetric analog output and a digital output; and of reducing the number of terminals by commonly using an electric path as a data communication input/output path and a flow signal output path.

An output circuit 201 comprises mainly a digital-analog converter DA, a frequency output circuit FC, and switches SW1, SW2.

A digital value produced by the digital processor CALC performing the adjustment calculation is entered into the digital-analog converter DA and the frequency output circuit FC. The digital-analog converter DA converts the received digital value into an analog voltage output. A reference used in generating this analog voltage output is a voltage supplied to the digital-analog converter DA. This voltage is switched by the switch SW2 between a voltage generated by an electronic circuit in the gas flow meter and a voltage supplied from outside to a ratiometric reference voltage terminal 232 (e.g., a reference voltage of an analog-digital converter in an automotive engine control unit) to enable selection between the non-ratiometric voltage output and the ratio metric output. The frequency output circuit FC outputs the received digital value as a desired digital output. An analog voltage output and a digital output are selected by the switch SW1.

The switching operation of these switches SW1, SW2 is carried out according to data in the storage device MEM which can be written during sensor adjustment.

A data input/output circuit 202 for transferring data between the outside of the gas flow meter and the storage device MEM into which the adjustment coefficients and the switching setting are written during the sensor adjustment, mainly comprises: a data conversion circuit I/O for converting the number of bits (8 or 16 bits) of data in the integrated circuit and one-bit data used during data transfer to and from the external circuits; a direction signal output circuit DIR for outputting a DIRECTION signal indicating whether the data conversion circuit I/O inputs or outputs data; a clock detection circuit CDECT for detecting a clock signal supplied to a CLOCK terminal; and a switch SW4 for selecting whether a data signal is to be entered into or output from the data conversion circuit I/O according to the signal from the direction signal output circuit DIR.

The detection signal from the clock detection circuit CDECT is entered into the data conversion circuit I/O which is activated by the signal. If a switch SW3 is added which is operated according to the detection signal, it is possible to combine the flow signal output path and the data input/output path into one path in the integrated circuit. To ensure that pulse noise to the CLOCK terminal will not undesirably operate the switch SW3, the detection signal is output only after a predetermined number of pulses are entered to the clock detection circuit CDECT.

Figure 22:
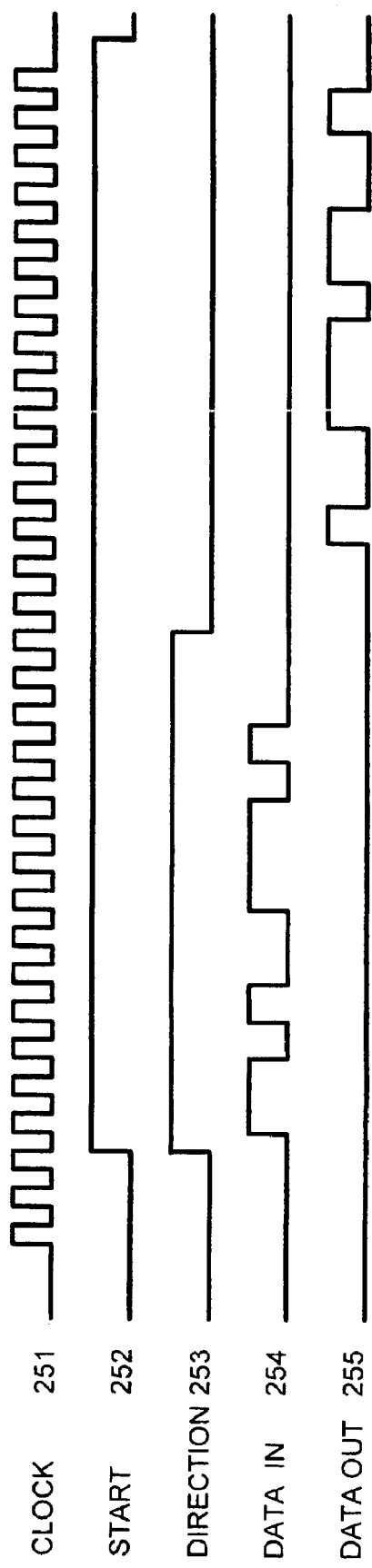
FIG. 22 is an outline timing chart for terminals of the data communication input/output circuit of FIG. 17.

FIG. 22 shows an example of data timing chart when data is input and output. When a CLOCK signal 251 is supplied to the CLOCK terminal, the clock detection circuit CDECT is operated to generate a START signal 252. The switch SW3 is operated by the START signal 252. The DIRECTION signal 253 is turned on or off by a predetermined number of clock pulses. The DIRECTION signal 253 operates the switch SW4 to change the direction of data flow, i.e., to select between a DATA IN signal 254 and a DATA OUT signal 255.

Figure 23:
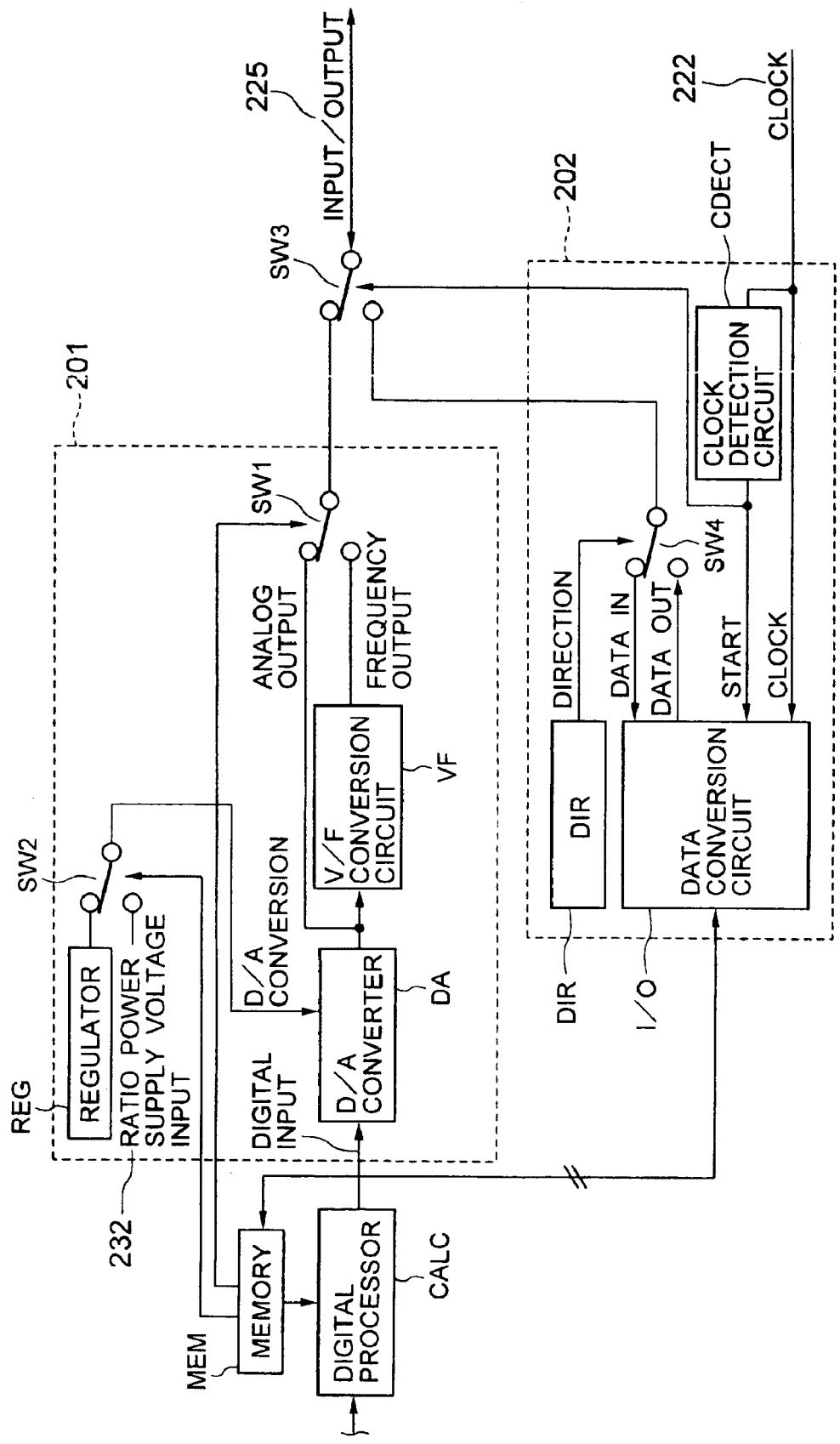
FIG. 23 is an outline circuit configuration of a data communication input/output circuit and a sensor output circuit, both used in the gas flow meter of the present invention.

FIG. 23 shows another embodiment of a circuitry according Lo this invention which is capable of reducing the number of flow signal output terminals used in the gas flow meter and the number of input/output terminals used for communication with the storage device in which adjustment data is written; of outputting as a sensor output one of a ratiometric analog output, a non-ratiometric analog output and a pulse output; and of reducing the number of terminals by commonly using the terminals as communication input/output terminals and sensor output terminals.

What is different from FIG. 21 is that a VF conversion circuit VF for converting an analog voltage into a digital output is inserted at a stage downstream of the digital-analog converter DA and that the switch SW1 selects between the analog voltage output and the digital output. The operation of this configuration is the same as that of FIG. 21 and thus its explanation is omitted.

With this configuration, therefore, the connection terminals with the outside of the gas flow meter can be constructed of at least four terminals: a power supply terminal, a ground terminal, a common terminal for flow signal output and data input/output, and a data input/output terminal.

Figure 24:
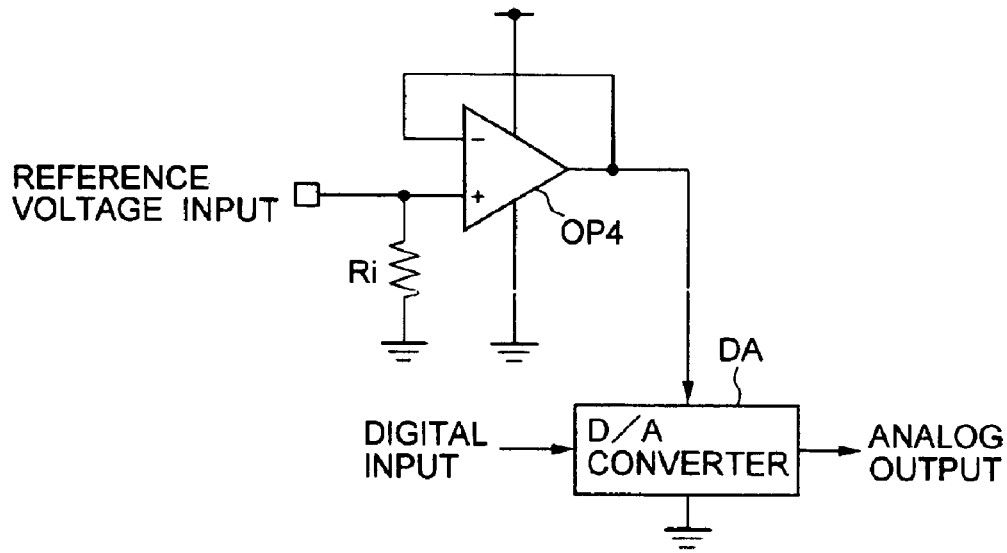
FIG. 24 is an outline circuit configuration of a power supply circuit unit for a digital-analog converter circuit used in the gas flow meter according to the present invention.

If the maximum current supplied from the external reference voltage of the engine control unit is small, there is a possibility that simply connecting this external reference voltage directly to the digital-analog converter DA, which includes an amplifier circuit at an output stage and has a large current consumption, may fail to drive the digital-analog converter DA. To deal with this problem, a buffer circuit is inserted, as shown in FIG. 24, which has a power supply terminal of an operational amplifier OP4 connected to a battery voltage not shown. With the input of the buffer circuit as a resistor, the buffer output is connected to the power supply terminal of the digital-analog converter DA to supply a current from the operational amplifier OP4 to the digital-analog converter DA for operation. The load resistance Ri of the buffer circuit is set to about 10 kilo-ohm.

The gas flow meter with a digital adjust circuit according to the present invention has an advantage that even if C-MOS devices not resistant to surges and overvoltages are used in the internal circuit, a high level of circuit integration and the use of digital circuitry can prevent failure or undesired operation.

Further, the overvoltage protection circuit included in the electronic circuit noise reduction circuit in the gas flow meter has an advantage of being able to minimize a drop in the supply voltage from the voltage supply terminal due to a voltage drop caused by the current limiting resistor used in the overvoltage protection circuit. The voltage limiter circuit can also be reduced in size.

In the gas flow meter output characteristic adjustment calculation, because a predetermined first-degree adjustment calculation formula is selected for calculation according to an input value, the calculation time is short and a non-linear adjustment can be made. Further, the circuit board temperature adjustment can also be performed simultaneously.

Further, because one electric path is commonly used both for the flow signal output and for the data input/output, it is possible to cope with different flow signal output specifications calling for a ratiometric analog output, a non-ratiometric analog output or a digital output, without increasing the number of terminals. A further feature of this invention is that the digital-analog converter at the output stage can be driven even when the maximum current supplied from the external reference voltage is small.

It is therefore possible to provide an optimum integrated circuit and configuration when the gas flow meter circuit is integrated into a digital circuit to reduce the cost of the gas flow meter and enhance the accuracy of the output.

What is claimed is:

1. A gas flow meter for detecting gas flow in an internal combustion engine, comprising
   a circuit connected to a higher supply voltage configured as an operational amplifier in the gas flow detection circuit and a circuit connected to a lower supply voltage is configured as a regulator that supplies a voltage to a digital adjusting circuit;
   a gas flow detection circuit for detecting a gas flow passing through a gas passage;
   the digital adjusting circuit for adjusting an output characteristic of said gas flow meter to a desired output characteristic and outputting a gas flow signal;
   a noise reduction circuit including an overvoltage protection circuit and supplying to the gas flow detection circuit and the adjusting circuit a voltage whose surges and overvoltages applied to a power supply terminal are reduced; and
   wherein there are two or more voltage supply paths for supplying different voltages to the gas flow detection circuit and the adjusting circuit through the overvoltage protection circuit.

2. The gas flow meter according to claim 1, wherein in one of the voltage supply paths for supplying a voltage having reduced surges and overvoltages to various circuits, a voltage limiter circuit that turns on when applied with a voltage in excess of a predetermined voltage is connected between a voltage supply terminals and a ground terminal and a current limiting resistor is connected between the power supply terminal and the voltage supply terminals;

in the other voltage supply path, another current limiting resistor is connected between the power supply terminal and the voltage supply terminals; and an overvoltage protection circuit is provided in which a diode is connected between each of the voltage supply terminals.

3. The gas flow meter according to claim 2, further including an overvoltage protection circuit having an additional diode connected between the voltage supply terminals and the ground terminal.

4. The gas flow meter according to claim 1, wherein in all of said voltage supply paths for supplying a voltage having reduced surges and overvoltages to various circuits, a voltage limiter circuit that turns on when applied with a voltage in excess of a predetermined voltage is connected between voltage supply terminals and a ground terminal and a current limiting resistor is connected between the power supply terminal and the voltage supply terminals; and an overvoltage protection circuit is provided in which the current limiting resistors connected to the respective voltage supply terminals have different resistance values.

5. The gas flow meter according to claim 4, further including an overvoltage protection circuit having an additional diode connected between the voltage supply terminals and the ground terminal.

6. The gas flow meter according to claim 1, wherein a part or all of devices included in said overvoltage protection circuit, said gas flow detection circuit and said adjusting circuit are formed in a common integrated circuit.

7. A gas flow meter for detecting gas flow in an internal combustion engine, wherein the external data communication terminals serve as a detected flow output terminal;

an adjusting circuit for adjusting a voltage output of a gas flow detection circuit which outputs a voltage signal representing a gas flow passing through a gas passage;

a storage device far storing data for adjustment;

a data input/output circuit;

wherein said data input/output circuit has two external data communication terminals for writing adjust data from outside into said storage device and for reading data from said storage device to the outside; and means for, after a predetermined number of two or more pulses have been supplied to one of the external data communication terminals of the data input/output circuit, allowing the adjusting circuit to enter into a data communication mode where it transfers data between the storage device and external circuits.

8. The gas flow meter according to claim 7, wherein the external data communication terminals serve as a detected flow output terminal.

9. The gas flow meter according to claim 7, wherein an integrated circuit substrate is provided and comprises said digital adjusting circuit and said regulator circuit formed thereon.

* * * * *